(12) United States Patent
Yoshioka et al.

(10) Patent No.: US 11,796,041 B2
(45) Date of Patent: Oct. 24, 2023

(54) PLANETARY GEAR ASSEMBLY, POWER-SPLIT STEPLESS TRANSMISSION, AND TRANSMISSION STRUCTURE

(71) Applicant: KANZAKI KOKYUKOKI MFG. CO., LTD., Amagasaki (JP)

(72) Inventors: Terunobu Yoshioka, Amagasaki (JP); Koji Iwaki, Amagasaki (JP)

(73) Assignee: KANZAKI KOKYUKOKI MFG. CO., LTD., Amagasaki (JP)

( * ) Notice: Subject to any disclaimer, the term of this patent is extended or adjusted under 35 U.S.C. 154(b) by 0 days.

(21) Appl. No.: 18/168,863

(22) Filed: Feb. 14, 2023

(65) Prior Publication Data
US 2023/0258254 A1    Aug. 17, 2023

(30) Foreign Application Priority Data

Feb. 15, 2022   (JP) ................................. 2022-021287

(51) Int. Cl.
*F16H 47/04*     (2006.01)
*F16H 37/04*     (2006.01)
(Continued)

(52) U.S. Cl.
CPC ........... *F16H 47/04* (2013.01); *F16H 37/042* (2013.01); *F16H 57/082* (2013.01);
(Continued)

(58) Field of Classification Search
CPC ...... F16H 41/04; F16H 37/042; F16H 57/082; F16H 59/044; F16H 61/2807; F16H 2037/048
(Continued)

(56) References Cited

U.S. PATENT DOCUMENTS

| | | | |
|---|---|---|---|
| 4,194,709 A | 3/1980 | Segerson et al. | |
| 2017/0175867 A1* | 6/2017 | Gross | F16H 61/468 |
| 2017/0350489 A1* | 12/2017 | Bailly | F16H 37/042 |

FOREIGN PATENT DOCUMENTS

WO     2020097650 A1    5/2020

* cited by examiner

*Primary Examiner* — Colby M Hansen
(74) *Attorney, Agent, or Firm* — CANTOR COLBURN LLP

(57) ABSTRACT

[Problem] To provide a planetary gear assembly that, while increasing the speed change range of a power-split stepless transmission formed in cooperation a stepless transmission, can reduce the overall size of the power-split stepless transmission. [Solution] The planetary gear assembly according to the present invention includes: a cylindrical transmission shaft, an output shaft inserted into the transmission shaft, first and second planetary gear mechanisms each having a first sun gear supported to the transmission shaft without a relative rotation about an axial line, first and second clutch mechanisms that are placed coaxially with the transmission shaft, and that engage and disengage a power transmission of power to standard rotary speed power input units of the first and second planetary gear mechanisms, and a connection member extrapolated to the transmission shaft with a free relative rotation about an axial line. The connection member, without a relative rotation around an axial line, connects, within the first planetary gear mechanism, a planetary element that is other than a sun gear and a planetary element that forms a standard rotary speed power input unit, with, within the second planetary gear mechanism, a planetary element that is other than a sun gear and a planetary element that forms a standard rotary speed power input unit, and the connection member, meanwhile, is non-rotatable relative to the output shaft about an axial line.

20 Claims, 19 Drawing Sheets

(51) Int. Cl.
  *F16H 59/04* (2006.01)
  *F16H 61/28* (2006.01)
  *F16H 57/08* (2006.01)
(52) U.S. Cl.
  CPC ....... *F16H 59/044* (2013.01); *F16H 61/2807*
     (2013.01); *F16H 2037/048* (2013.01)
(58) Field of Classification Search
  USPC .......................................................... 475/83
  See application file for complete search history.

PLANETARY GEAR ASSEMBLY, POWER-SPLIT STEPLESS TRANSMISSION, AND TRANSMISSION STRUCTURE

CROSS REFERENCE FOR RELATED APPLICATIONS

The present invention claims priority under 35 U.S.C. § 119 to Japanese Application No. 2022-021287, filed on Feb. 15, 2022, and to Japanese Application No. 2022-034971, filed on Feb. 15, 2022, the entire content of which is incorporated herein by reference.

TECHNICAL FIELD

The present invention relates to a planetary gear assembly having two planetary gear mechanisms, a power-split stepless transmission provided with the planetary gear assembly, and a transmission structure provided with the power-split stepless transmission.

BACKGROUND ART

A power-split stepless transmission that combines the planetary gear assembly with a stepless transmission thereby to expand the speed change range is widely known. A power-split stepless transmission device that uses a hydrostatic stepless transmission (HST: Hydro Static Transmission) as a stepless transmission is referred to as an HMT (Hydro Mechanical Transmission) device and is preferably used in a transmission structure for a work vehicle such as an agricultural combine and a tractor.

For example, Patent Document 1 below discloses an HMT device (hereinafter referred to as a first conventional example) including: an HST having a pump shaft operatively connected to a drive source and a motor shaft placed parallel to the pump shaft, a drive shaft coaxially connected to the pump shaft without a relative rotation about an axial line, a first transmission shaft coaxially connected to the motor shaft without a relative rotation about an axial line, a second transmission shaft placed parallel to both the drive shaft and the first transmission shaft, a first planetary gear mechanism having a first sun gear, a first carrier and a first internal gear, and placed coaxially with the first transmission shaft, a second planetary gear mechanism having a second sun gear, a second carrier and a second internal gear, and placed coaxially with the second transmission shaft, an output shaft placed coaxially with the second transmission shaft with a free relative rotation, and first to fourth clutch mechanisms.

The first sun gear is supported to the first transmission shaft without a relative rotation about an axial line, the first carrier is operatively connected via the first clutch mechanism to the first transmission shaft (i.e., the motor shaft) and, operatively connected via the second clutch mechanism to the drive shaft (i.e., the pump shaft), and the first internal gear is operatively connected to the output shaft.

Further, the second internal gear is operatively connected via the third clutch mechanism to the drive shaft (i.e., the pump shaft), the second carrier is operatively connected via the fourth clutch mechanism to the first transmission shaft (i.e., the motor shaft), and the second sun gear is supported to the second transmission shaft without a relative rotation about an axial line, and the second transmission shaft is operatively connected to the output shaft.

The first conventional example can selectively generate a first transmission state in which the first clutch mechanism is engaged and the second to fourth clutch mechanisms are disengaged, a second transmission state in which the second clutch mechanism is engaged and the first, third and fourth clutch mechanisms are disengaged, a third transmission state in which the third and fourth clutch mechanisms are engaged and the first and second clutch mechanisms are disengaged.

In the first transmission state, the HST output from the motor shaft is input to both the first sun gear and the first carrier, and rotary power is output from the first internal gear to the output shaft.

In the second transmission state, standard rotary speed power from the drive source is input to the first carrier and the HST output from the motor shaft is input to the first sun gear, and composite rotary power by the first planetary gear mechanism is output from the first internal gear to the output shaft.

In the third transmission state, the standard rotary speed power from the drive source is input to the second internal gear and the HST output from the motor shaft is input to the second carrier, and the composite rotary power by the second planetary gear mechanism is output from the second sun gear to the second transmission shaft, to be operatively transmitted to the output shaft.

The first conventional example having the above configuration is useful in expanding the rotary speed change range that may be generated at the output shaft, but requires three shafts (the drive shaft, the first transmission shaft, and the second transmission shaft) placed in an overlapped manner in the axial direction, and also requires a gear train for performing the power transmission between the three shafts, thus leaving room for improvement in terms of placement space, transmission efficiency, and cost.

Further, Patent Document 2 below discloses an HMT device (hereinafter referred to as a second conventional example) including a drive shaft operatively connected to a drive source, an HST in which a pump shaft, while being placed parallel to the drive shaft, is operatively connected to the drive shaft, and a motor shaft, in a position displaced from the drive shaft and the pump shaft, is placed parallel to both shafts, a first transmission shaft, in a position displaced from the drive shaft, the pump shaft and the motor shaft, placed parallel to the above shafts, a first planetary gear mechanism having a first sun gear, a first carrier and a first internal gear, and placed coaxially with the first transmission shaft, a first middle shaft placed coaxially with the first planetary gear mechanism, a second transmission shaft coaxially connected to the motor shaft without a relative rotation about the shaft axis, a second planetary gear mechanism having a second sun gear, a second carrier and a second internal gear, and placed coaxially with the second transmission shaft, a second middle shaft placed coaxially with the second planetary gear mechanism, an output shaft, a first clutch mechanism that engages and disengages a power transmission from the first middle shaft to the output shaft, and a second clutch mechanism that engages and disengages a power transmission from the second middle shaft to the output shaft (FIG. 1, etc. of Patent Document 2 above).

The second conventional example requires many shafts including the drive shaft, the first transmission shaft, the second transmission shaft, the first middle shaft and the second middle shaft, and is very disadvantageous in terms of placement space, transmission efficiency, and cost.

Further, the Patent Document 2 also discloses an HMT device (hereinafter referred to as a third conventional example) provided with an HST, and first and second planetary gear mechanisms placed in series (FIG. 5, etc. of the Patent Document 2).

In the third conventional example as well, the three shafts, including the drive shaft that is coaxially connected to the pump shaft without a relative rotation about an axial line, the transmission shaft that, while being coaxially connected with the motor shaft without a relative rotation about an axial line, supports the first and second planetary gear mechanisms as well as the first to third clutch mechanisms, and an output shaft that is operatively connected via a gear train to the transmission shaft, are placed in an overlapped state in the axial direction, leaving room for improvement in terms of placement space, transmission efficiency, and cost.

PRIOR ART DOCUMENT

Patent Document

Patent document 1: U.S. Pat. No. 4,194,709
Patent Document 2: International Publication No. WO 2020/097650

SUMMARY OF INVENTION

Technical Problem

The present invention has been made in view of the conventional technologies; it is a first object of the present invention to provide a planetary gear assembly that forms a power-split stepless transmission in cooperation with a stepless transmission, and that, while increasing the output speed change range of the power-split stepless transmission, can reduce the overall size of the power-split stepless transmission.

Further, it is a second object of the present invention to provide an HMT device that uses an HST as a stepless transmission in combination with first and second planetary gear mechanisms, and that may be downsized while expanding the speed change range of the HMT output.

Further, it is a third object of the present invention to provide a transmission structure that is provided with the HMT device including the HST and first and second planetary gear mechanisms, that can downsize the HMT device while expanding the speed change range of the HMT output, and further, that can output the HMT output with good controllability.

Solution to Problem

For accomplishing the first object, a first mode of the present invention provides a planetary gear assembly that forms a power-split stepless transmission in cooperation with a stepless transmission for steplessly changing, between a first speed and a second speed, standard speed power operatively input from a drive source, the planetary gear assembly including: a cylindrical transmission shaft to which an HST output is input; an output shaft that, while being at least partially extended outward from the transmission shaft, is placed in the transmission shaft with a free relative rotation about an axial line; a first planetary gear mechanism having three planetary elements including a first sun gear, a first carrier, and a first internal gear, the first sun gear being supported to the transmission shaft without a relative rotation about an axial line, the first planetary gear mechanism being so made that one of the first carrier and the first internal gear forms a standard rotary speed power input unit to which the standard rotary speed power is input; a second planetary gear mechanism having three planetary elements including a second sun gear, a second carrier, and a second internal gear, the second planetary gear mechanism being so made that the second sun gear is supported to the transmission shaft without a relative rotation about an axial line, and among the second carrier and the second internal gear, a planetary element different from a planetary element that forms the standard rotary speed power input unit in the first planetary gear mechanism forms a standard rotary speed power input unit to which the standard rotary speed power is input; a first clutch mechanism that is placed coaxially with the transmission shaft, and that engages and disengages a power transmission of the standard rotary speed power to the standard rotary speed power input unit of the first planetary gear mechanism; a second clutch mechanism that is placed coaxially with the transmission shaft, and that and engages and disengages a power transmission of the standard rotary speed power to the standard rotary speed power input unit of the second planetary gear mechanism; and a connection member extrapolated to the transmission shaft with a free relative rotation about an axial line, wherein the connection member, without a relative rotation around an axial line, connects, among the three planetary elements in the first planetary gear mechanism, the planetary element that forms a composite output unit other than the first sun gear and the planetary element that forms the standard rotary speed power input unit, with, among the three planetary elements in the second planetary gear mechanism, the planetary element that forms a composite output unit other than the second sun gear and the planetary element that forms the standard rotary speed power input unit, and the connection member, meanwhile, is non-rotatable relative to the output shaft about an axial line.

Preferably, the planetary gear assembly further can include: a first driven gear which is directly or indirectly supported to an outward extended site of the output shaft with a free relative rotation about an axial line, and to which the standard rotary speed power is input, a second driven gear that is directly or indirectly supported to the transmission shaft with a free relative rotation about an axial line, and to which the standard rotary speed power is input.

In this case, the first clutch mechanism is so supported to an outward extended site of the output shaft as to engage and disengage the power transmission from the first driven gear to the standard rotary speed power input unit of the first planetary gear mechanism, and the second clutch mechanism is so supported to the transmission shaft as to engage and disengage the power transmission from the second driven gear to the standard rotary speed power input unit of the second planetary gear mechanism.

The planetary gear assembly according to the first mode further includes: a third driven gear which is directly or indirectly supported to the transmission shaft with a free relative rotation about an axial line, to which the standard rotary speed power is input, and which is smaller in pitch diameter than the second driven gear, and a third clutch mechanism so supported to the transmission shaft as to engage and disengage the power transmission from the third driven gear to the standard rotary speed power input unit of the second planetary gear mechanism.

In various configurations of the first mode, the first internal gear and the second carrier form the standard rotary speed power input units in the first and second planetary gear mechanisms, respectively.

In this case, the connection member connects the first carrier and the second internal gear without a relative rotation about an axial line.

Preferably, the first clutch mechanism has a first clutch housing directly or indirectly supported to the output shaft with a free relative rotation about an axial line, a first friction plate group including a first drive-side friction plate supported to the first clutch housing without a relative rotation and with an axial movement, and a first driven-side friction plate placed opposing the first drive-side friction plate, a first rotary member that, while being extrapolated to the output shaft with a free relative rotation about an axial line, supports the first driven-side friction plate without a relative rotation and with an axial movement, and a first piston that frictionally engages the first friction plate group by a pressure oil supplied to an oil chamber in the first clutch housing, the first clutch housing is connected to the first driven gear without a relative rotation about an axial line, and the first rotary member is connected to the first internal gear without a relative rotation about an axial line.

Preferably, the second clutch mechanism has a second clutch housing directly or indirectly supported to the transmission shaft with a free relative rotation about an axial line, a second friction plate group including a second drive-side friction plate supported to the second clutch housing without a relative rotation and with an axial movement, and a second driven-side friction plate placed opposing the second drive-side friction plate, a second rotary member that, while being extrapolated to the transmission shaft with a free relative rotation about an axial line, supports the second driven-side friction plate without a relative rotation and with an axial movement, and a second piston that frictionally engages the second friction plate by a pressure oil supplied to an oil chamber in the second clutch housing, the second clutch housing is connected to the second driven gear without a relative rotation about an axial line, and the second rotary member is connected to the second carrier without a relative rotation about an axial line of the second sun gear.

The first carrier may have a first carrier pin that supports the first planetary gear, with a free rotation about an axial line, which is meshed with both the first sun gear and the first internal gear and which revolves around the first sun gear.

The first carrier pin has an intermediate site which supports the first planetary gear, and first and second extended sites that extend from the intermediate site to one side and another side in an axial direction, respectively.

In the configuration where the first internal gear and the second carrier form the standard rotary speed power input units, preferably, the connection member has a first annular unit positioned on one side in an axial direction, a second annular unit which is, on the other side in the axial direction, spaced apart from the first annular unit, and a connection portion that connects the first and second annular units.

A first engaging hole into which the first extended site of the first carrier pin is inserted, and a second engaging hole into which the second extended site of the first carrier pin is inserted are provided in the first and second annular units, respectively, and the connection portion is so configured as to connect the first and second annular units, while defining space which is for placing the planetary gear supported to the intermediate site of the first carrier pin.

Further, a concave and convex engaging portion that engages concavely/convexly with an outer peripheral face of the output shaft and an outer tooth portion that engages with the second internal gear which are provided on an inner peripheral face and an outer peripheral face, respectively, which are formed by the first annular unit, the connection portion and the second annular unit.

In the configuration where the first internal gear and the second carrier form the standard rotary speed power input units, preferably, the first planetary gear mechanism so sets a gear ratio that, in a transmission state in which the standard rotary speed power is operatively input to the first internal gear forming the standard rotary speed power input unit and stepless speed-change output is operatively input to the first sun gear, the first carrier rotates at an increasing speed in a first rotary direction on one side about the axial line as the stepless speed-change output is changed from the first speed's side to the second speed's side, and the first carrier rotates at a given first gear maximum speed in the first rotary direction when the stepless speed-change output is set at a given first gear maximum speed set speed.

The second planetary gear mechanism so sets a gear ratio that, in a transmission state in which the standard rotary speed power is operatively input to the second internal gear forming the standard rotary speed power input unit and stepless speed-change output is operatively input to the second sun gear, the second internal gear rotates at a first gear maximum speed in the first rotary direction when the stepless speed-change output is set to the first gear maximum speed HST speed, the rotary speed of the second internal gear is increased from the first gear maximum speed to a second gear maximum speed as the stepless speed-change output is changed from the first gear maximum speed set speed toward the second speed's side up to a given second gear maximum speed set speed.

Preferably, the gear ratio of the first planetary gear mechanism is so set that, in the transmission state, the first carrier is set to 0 speed when the stepless speed-change output is set to a given 0 speed set speed.

Preferably, the 0 speed set speed is a speed that is changed, by a given speed, from the first speed to the second speed's side.

The planetary gear assembly according to the present invention, preferably, may include: an interlocked gear which is supported to the transmission shaft without a relative rotation, and to which a stepless speed-change output is input.

For accomplishing the second object, a second mode of the present invention provides an HMT device that works in cooperation with an HST that, between a first HST speed and a second HST speed, steplessly changes a standard rotary speed power operatively input from a drive source to a pump shaft, and outputs an HST output, which is after the speed change, from a motor shaft, the HMT device including: a drive shaft to which the standard rotary speed power is operatively transmitted from the drive source; cylindrical transmission shaft to which the HST output is operatively transmitted from the motor shaft; an output shaft, in a state where at least a part of the output shaft extended outward from the transmission shaft, inserted into the transmission shaft with a free relative rotation about a shaft line; a first planetary gear mechanism that has three planetary elements including a first sun gear, a first carrier, and a first internal gear, the first sun gear being supported to the transmission shaft without a relative rotation about an axial line, and one of the first carrier and the first internal gear forming a standard rotary speed power input unit to which the standard rotary speed power is input; a first transmission gear train including a first drive gear that is supported to the drive shaft without a relative rotation about an axial line, and a first driven gear that, while being directly or indirectly supported to the output shaft with a free relative rotation about an axial line, is operatively meshed with the first drive gear; a first clutch mechanism that is placed coaxially with the transmission shaft, and that engages and disengages a power transmission of the standard rotary speed power from the first driven gear to the standard rotary speed power input unit of the first planetary gear mechanism; a second planetary gear mechanism that has three planetary elements including a second sun gear, a second carrier, and a second internal gear, the second planetary gear mechanism being so made that the second sun gear is supported to the transmission shaft without a relative rotation about an axial line, and among the second carrier and the second internal gear, a planetary element different from a planetary element that forms the standard rotary speed power input unit in the first planetary mechanism forms a standard rotary speed power input unit to which the standard rotary speed power is input; a second transmission gear train including a second drive gear 136(2) that is supported to the drive shaft without a relative rotation about an axial line, and a second driven gear that, while being directly or indirectly supported to the transmission shaft with a free relative rotation about an axial line, is operatively meshed with the second drive gear 136(2); a second clutch mechanism that is placed coaxially with the transmission shaft, and that engages and disengages a power transmission of the standard rotary speed power from the second driven gear to the standard rotary speed power input unit of the second planetary gear mechanism, wherein the connection member, without a relative rotation around an axial line, connects, among the three planetary elements in the first planetary gear mechanism, the planetary element that forms a composite output unit other than the first sun gear and the planetary element that forms the standard rotary speed power input unit, with, among the three planetary elements in the second planetary gear mechanism, the planetary element that forms a composite output unit other than the second sun gear and the planetary element that forms the standard rotary speed power input unit, and the connection member, meanwhile, is non-rotatable relative to the output shaft about an axial line.

In the HMT device according to the first mode, the first internal gear forms the standard rotary speed power input unit of the first planetary gear mechanism and the second carrier forms the standard rotary speed power input unit of the second planetary gear mechanism, and the connection member connects the first carrier and the second internal gear without a relative rotation about an axial line.

In this case, a gear ratio of the first planetary gear mechanism is so that, in a transmission state, the first carrier is 0 speed when the HST output is set to a given 0 speed set HST speed, the first carrier rotates at an increasing speed in a first rotary direction, which is one side about the axial line, as the HST output is changed from the first HST speed's side to the second HST speed's side, and the first carrier rotates at a given first gear maximum speed in the first rotary direction when the HST output is set to a given first gear maximum speed HST speed.

The gear ratio of the second planetary gear mechanism is so that, in the transmission state, the second internal gear rotates at a first gear maximum speed in a first rotary direction when the HST output is set to the first gear maximum speed HST speed, and the rotary speed of the second internal gear increases from the first gear maximum speed to a second gear maximum speed as the HST output is changed from the first gear maximum speed HST speed toward the second HST speed's side up to a given second gear maximum speed HST speed.

Preferably, the first clutch mechanism includes: a first clutch housing directly or indirectly supported to the output shaft with a free relative rotation about an axial line, a first friction plate group including a first drive-side friction plate supported to the first clutch housing without a relative rotation and with an axial movement, and a first driven-side friction plate placed opposing the first drive-side friction plate, the first rotary member, while being extrapolated to the output shaft with a free relative rotation about an axial line, supports the first driven-side friction plate without a relative rotation and with an axial movement, and a first piston that frictionally engages the first friction plate group by a pressure oil supplied to an oil chamber in the first clutch housing, wherein the first clutch housing is connected to the first driven gear without a relative rotation about an axial line, and the first rotary member is connected to the first internal gear without a relative rotation about an axial line.

Preferably, the second clutch mechanism includes: a second clutch housing directly or indirectly supported to the transmission shaft with a free relative rotation about an axial line, a second friction plate group including a second drive-side friction plate supported to the second clutch housing without a relative rotation and with an axial movement, and a second driven-side friction plate placed opposing the second drive-side friction plate, a second rotary member that, while being extrapolated to the transmission shaft with a free relative rotation about an axial line, supports the second driven-side friction plate without a relative rotation and with an axial movement, and a second piston that frictionally engages the second friction plate group by a pressure oil supplied to an oil chamber in the second clutch housing, wherein the second clutch housing is connected to the second driven gear without a relative rotation about an axial line, and the second rotary member is connected to the second carrier without a relative rotation about an axial line of the second sun gear.

The HMT device according to the second mode, compared to the HMT device according to the first mode, includes: a third transmission gear train that includes a third drive gear supported to the drive shaft without a relative rotation about an axial line, and a third driven gear that, while being directly or indirectly supported to the transmission shaft with a free relative rotation about an axial line, is operatively meshed with the third drive gear, and a third clutch mechanism that is placed coaxially with the transmission shaft, and engages and disengages a power transmission of the standard rotary speed power from the third driven gear to the standard rotary speed power input unit of the second planetary gear mechanism.

The third transmission gear train is higher in speed change ratio than the second transmission gear train.

For accomplishing the third object, a third mode of the present invention provides a transmission structure including the HMT device according to the first mode, the transmission structure including: a speed-change operated member operable by a human operator in a shift range between a 0 speed position and a maximum speed position, a shift position sensor that detects a shift position of the speed-change operated member, a first clutch actuated member that switches an engaging and disengaging actuation of the first clutch mechanism, a second clutch actuated member that switches an engaging and disengaging actuation of the second clutch mechanism, an HST actuated member that actuates an output adjusting member of the HST, an output sensor that directly or indirectly detects a rotary speed of the output shaft, a control unit that controls actuations of the first and second clutch actuated members (145(1), 145(2)) and the HST actuated member.

In the transmission structure according the third mode, the shift range is divided into a low speed side first gear shift range set in a range from the 0 speed position to the first gear maximum speed position, and a high speed side second gear shift range set in a range from the first gear maximum speed position to the maximum speed position.

The control unit actuates the first and second clutch actuated members in response to a shift state of the speed-change operated member, as follows: when the speed-change operated member is in the first gear shift range, engaging the first clutch mechanism and shutting off the second clutch mechanism thereby to generate a first gear transmission state, when the speed-change operated member is in the first gear maximum speed position, engaging one of the first and second clutch mechanisms and shutting off another of the first and second clutch mechanisms, and when the speed-change operated member is in the second gear shift range, shutting off the first clutch mechanism and engaging the second clutch mechanism thereby to generate a second gear transmission state.

Further, the control unit so operates the HST actuated member that the HST output becomes a 0 speed set HST speed in response to the speed-change operated member's operation to the zero speed position, the HST output is shifted from the first HST speed's side to the second HST speed's side in response to the speed-change operated member's operation to the increasing speed side in the first gear transmission state, the HST output becomes the first gear maximum speed HST speed in response to the speed-change operated member's operation to the first gear maximum speed position, the HST output is shifted from the second HST speed's side to the first HST speed's side in response to the speed-change operated member's operation to the increasing speed side in the second gear transmission state, and the HST output becomes the second gear maximum speed HST speed in response to the speed-change operated member's operation to the second gear maximum speed position.

For accomplishing the third object, a fourth mode of the present invention provides a transmission structure including the HMT device according to the second mode, the transmission structure including, a speed-change operated member operable by a human operator in a shift range between a 0 speed position and a maximum speed position; a shift position sensor that detects a shift position of the speed-change operated member; a first clutch actuated member that switches an engaging and disengaging actuation of the first clutch mechanism; a second clutch actuated member that switches an engaging and disengaging actuation of the second clutch mechanism; a third clutch actuated member that switches an engaging and disengaging actuation of the third clutch mechanism; an HST actuated member that actuates the output adjusting member of the HST; an output sensor that directly or indirectly detects rotary speed of the output shaft; and a control unit that controls actuations of the first to third clutch actuated members, and the HST actuated member.

In the transmission structure according to the fourth mode, the shift range is divided into a low speed side first gear shift range set in a range from the 0 speed position to the first gear maximum speed position, a middle speed side second gear shift range set in a range from the first gear maximum speed position to the second gear maximum speed position, and a high speed side third gear shift range set in a range from the second gear maximum speed position to the maximum speed position.

The control unit actuates the first to third clutch actuated members in response to a shift state of the speed-change operated member, as follows: when the speed-change operated member is operated in the first gear shift range, engaging the first clutch mechanism and shutting off the second and third clutch mechanisms thereby to generate a first gear transmission state, when the speed-change operated member is operated in the first gear maximum speed position, engaging one of the first and second clutch mechanisms and shutting off the clutch mechanism which remains, when the speed-change operated member is operated in the second gear shift range, shutting off the first and third clutch mechanisms and engaging the second clutch mechanism thereby to generate a second gear transmission state, when the speed-change operated member is operated in the second gear maximum speed position, engaging one of the second and third clutch mechanisms and shutting off the clutch mechanism which remains, and when the speed-change operated member is operated in the third gear shift range, shutting off the first and second clutch mechanisms and engaging the third clutch mechanism thereby to generate a third gear transmission state.

Further, the control unit actuates the HST actuated member in response to the shift state of the speed-change operated member, as follows: when the speed-change operated member is in the 0 speed position, the HST output is the 0 speed set HST speed, the HST output is changed from the first HST speed's side to the second HST speed's side in response to the speed-change operated member's operation to an increasing speed side in the first gear transmission state, and the HST output becomes a first gear maximum speed HST speed when the speed-change operated member reaches the first gear maximum speed position, the HST output is changed from the second HST speed's side to the first HST speed's side in response to the speed-change operated member's operation to the increasing speed side in the second gear transmission state, and the HST output becomes the second gear maximum speed HST speed in the speed-change operated member's second gear maximum speed position, the HST output is changed from the second gear maximum speed HST speed to a third gear minimum speed HST speed at the time of shifting from the second gear transmission state to the third gear transmission state, and the HST output is changed from the second HST speed's side to the first HST speed's side in response to the speed-change operated member's operation to the increasing speed side in the third gear transmission state, and the HST output becomes a given third gear maximum speed HST speed in response to the speed-change operated member's operation to the maximum speed position.

The third gear minimum speed HST speed is so set that the output shaft's rotary speed when the HST output is set to the second gear maximum speed in the second gear transmission state matches the output shaft's rotary speed when the HST output is set to the third gear minimum speed HST speed in the third gear transmission state.

The transmission structure according to a first example of the present invention, further includes: a forward and rearward switch mechanism that is capable of selectively taking between a forward rotary output state in which HMT power operatively input from the output shaft is output without changing a rotary direction of the HMT power, and a reverse rotary output state in which the HMT power is output by reversing the rotary direction, and a forward and rearward actuated member that actuates the forward and rearward switch mechanism.

In the transmission structure according to the first example, the shift range of the speed-change operated member includes a forward-side shift range from the zero speed position to the forward-side maximum speed position, and a rearward-side shift range from the zero speed position to the rearward-side maximum speed position.

The control unit actuates the forward and rearward actuated member so that the forward and rearward switch mechanism is in the forward rotary output state when the speed-change operated member is positioned in the forward-side shift range, and the forward and rearward switch mechanism is in the reverse rotary output state when the speed-change operated member is positioned in the rearward-side shift range.

The transmission structure according to a second example of the present invention, further includes: a forward and rearward switch mechanism that is capable of selectively taking between a forward rotary output state in which HMT power operatively input from the output shaft is output without changing a rotary direction of the HMT power, and a reverse rotary output state in which the HMT power is output by reversing the rotary direction, and a forward and rearward switch operated member for human operation.

The output state of the forward and rearward switch mechanism is switched in response to the operation of the forward and rearward switch operated member, mechanically by using the human operation on the forward and rearward switch operated member, or by the actuated member operatively controlled by the control unit.

The transmission structure as according to the present invention may further include: an auxiliary transmission capable of shifting the HMT power, which is operatively input from the output shaft, to a plurality of gears including a low gear and a high gear.

Advantageous Effects of Invention

The planetary gear assembly according to the present invention, while increasing the speed change range of the stepless speed-change output in the power-split stepless transmission that forms the power-split stepless transmission in cooperation with the stepless transmission, can reduce the overall size of the power-split stepless transmission.

The HMT device according to the present invention can be downsized while expanding the speed change range of the HMT output.

The transmission structure according to the present invention can downsize the HMT device while expanding the speed change range of the HMT output, and further, can output the HMT output with good controllability.

DESCRIPTION OF EMBODIMENTS

First Embodiment

One embodiment of a planetary gear assembly according to the present invention will be described below with reference to the accompanying drawings.

Figure 1:
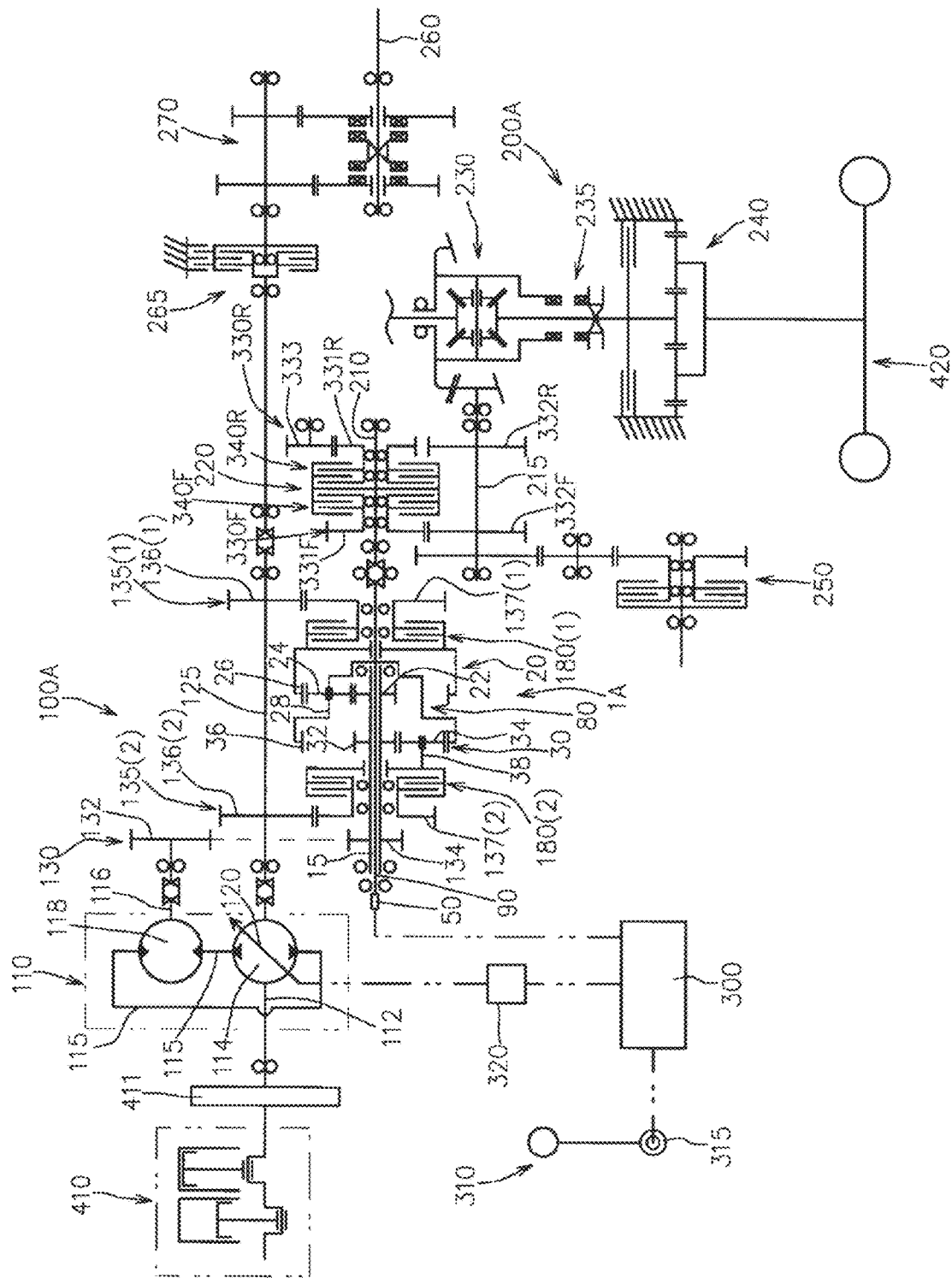
FIG. 1 is a schematic diagram of transmission of a transmission structure of a work vehicle to which a planetary gear assembly according to the first embodiment is applied.
Figure 2:
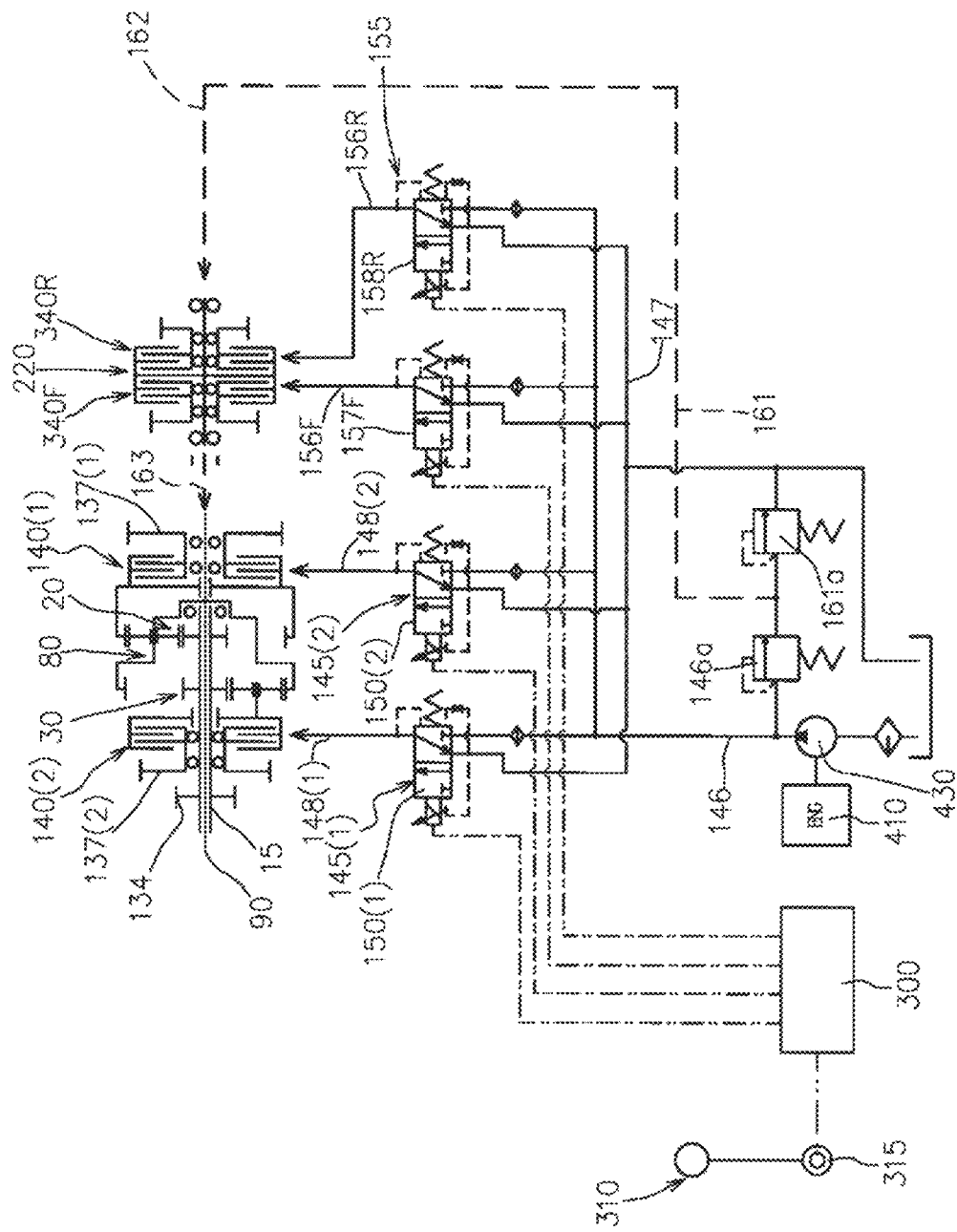
FIG. 2 is a hydraulic circuit diagram of the transmission structure.

FIGS. 1 and 2 each show a transmission schematic and hydraulic circuit diagrams of a transmission structure 200A in a work vehicle to which a planetary gear assembly 1A is applied.

As shown in FIG. 1, the work vehicle has a drive source 410, a main drive wheel 420, and a transmission structure 200A interposed in a run-system transmission path from the drive source 410 to the main drive wheel 420. Further, the sign 411 in FIG. 1 and FIG. 2 is a flywheel included in the drive source 410.

The planetary gear assembly 1A forms a power-split stepless transmission 100A in cooperation with a stepless transmission 110 which steplessly shifts and outputs standard rotary speed power operatively input from the drive source 410 and which is capable of outputting a stepless speed-change rotation in the forward and reverse rotary directions, and which is used as a component of the transmission structure 200A. There are various types of stepless transmissions 110, such as electric, hydraulic, and mechanical, but a hydrostatic stepless transmission (HST: Hydro Static Transmission) is used in the present embodiment. The power-split stepless transmission using the HST (Hydro Static Transmission) is referred to as HMT (Hydro Mechanical Transmission) device (hydrostatic-mechanical stepless transmission).

That is, in the present embodiment shown in FIG. 1, the transmission structure 200A is provided with the HMT device 100A including the HST 110 and the planetary gear assembly 1A.

As shown in FIG. 1, in addition to the HMT device 100, the transmission structure 200A is further provided with a forward and rearward switch mechanism 220 that can switch the rotary direction of the output of the HMT device 100A (HMT output) in the forward and rearward direction, and a differential mechanism 230 that differentially transmits the output of the forward and rearward switch mechanism 220 to the pair of main drive wheels 420 on right and left.

The transmission structure 200A further has a run brake mechanism 240 that selectively applies a brake force to the pair of main drive wheels 420, a differential lock mechanism 235 that forcibly synchronously drives the pair of main drive wheels 420, and an auxiliary drive wheel-dedicated drive power takeout mechanism 250 that can selectively output the output of the forward and rearward switch mechanism 220.

Further, the transmission structure 200A has a PTO multi-step transmission 270 including a PTO shaft 260 (PTO: power take off) that outputs a rotary power to the outside, and a PTO clutch 265 interposed to a PTO transmission path extending from the drive source 410 to the PTO shaft 260.

The transmission structure 200A, the differential mechanism 230, the auxiliary drive wheel-dedicated drive power takeout mechanism 250, and the PTO multi-step transmission 270 are cased in a transmission case (not shown).

The stepless transmission 110 is so configured as to input the standard rotary speed power from the drive source 410, thereby to steplessly change the speed between the first speed as a rotary speed from the zero output state to a forward rotary direction and the second speed as a rotary speed from the zero output state to a reverse rotary direction, and thereby to output stepless speed-change output after the speed change.

Specifically, as shown in FIG. 1 and FIG. 2, the stepless transmission 110, when using the HST 110, has a pump shaft 112 to which the standard rotary speed power is operatively input from the drive source 410, a hydraulic pump 114 that is actuated by receiving the rotation of the pump shaft 112, a hydraulic motor 118 that is fluidly connected via a closed circuit 115 (a pair of hydraulic lines) to the hydraulic pump 114 and hydraulically driven to rotate by receiving a hydraulic oil from the hydraulic pump 114, a motor shaft 116 that takes out an HST output from the hydraulic motor 118, and an output adjusting member 120 that changes the capacity of at least one of the hydraulic pump 114 and the hydraulic motor 118.

The output adjusting member 120 is so configured as to change, from the hydraulic pump 114's hydraulic oil discharge flowrate being zero, the discharge direction and capacity (discharge flowrate) of the hydraulic pump 114, and is operated in the forward rotary actuation range defined from the neutral position having the hydraulic pump 114's hydraulic oil discharge flowrate being zero, to the first actuation end position, and the reverse rotary actuation range defined from the zero output position to the second actuation end position. The HST 110 is so configured that the ratio of the rotary speed of the HST output from the motor shaft 116, to the standard rotary speed input to the pump shaft 112 (i.e., speed change ratio of the HST 110) can be steplessly changed between the first HST speed as the rotary speed from the zero output state to the forward rotary direction and the second HST speed as the rotary speed from the zero output state to the reverse rotary direction in response to the operation position of the output adjusting member 120 within the forward/reverse actuation range.

In the present embodiment, the HST 110, from the hydraulic pump 114's hydraulic oil discharge flowrate being zero, switches the discharge direction between one direction and the other direction thereby to make it possible to steplessly make the forward/reverse switching of the HST output's rotary direction.

That is, in the HST 110, when the rotary direction of the standard rotary speed power is the first rotary direction (e.g., forward rotary direction), the HST output's rotary speed (first HST speed) when the output adjusting member 120 is positioned in the first actuation end position is the maximum speed (−max) in the second rotary direction (e.g., reverse rotary direction) opposite to the first rotary direction, and the HST output's rotary speed (second HST speed) when the output adjusting member 120 is positioned in the second actuation end position is the maximum speed (+max) in the first rotary direction (e.g., forward rotary direction).

In this case, positioning the output adjusting member 120 in the neutral position between the first and second actuation end positions causes the HST output's rotary speed to be a neutral speed.

The HST 110 can take a variety of modes, including axial and radial piston types.

When the HST 110 is of the axial piston type, the output adjusting member 120 may be a movable swash plate. When the HST 110 is of the radial piston type, the output adjusting member 120 may be a movable cam ring.

The output adjusting member 120 may be operated mechanically or electrically or electro-hydraulically in response to a human operation.

That is, as shown in FIG. 1, the transmission structure 200A includes a speed-change operated member 310 that is manually operable in the shift range between the 0 speed position, where the vehicle stops, and the maximum speed position, a shift position sensor 315 that detects the shift position of the speed-change operated member 310, an HST actuated member 320 that actuates the output adjusting member 120, and a control unit 300 that executes an actuating control of the HST actuated member 320 according to the shift position of the speed-change operated member 310.

In the present embodiment, the speed-change operated member 310 is of a lever type.

The HST actuated member 320, as long as the output adjusting member 120 can be actuated by a control signal from the control unit 300, may take various modes, such as a hydraulic actuator that includes a hydraulic servo mechanism and an electric actuator that includes a solenoid valve which switches the supply and discharge of a pressure oil to and from the hydraulic servo mechanism.

As is customary, a rotary sensor (not shown), which detects the rotary speed of the HST output, which is of the HST actuated member 320 and is used for correcting the speed in response to the command value, is provided near the motor shaft 116 or near a gear that integrally rotates with the motor shaft 116.

Figure 3:
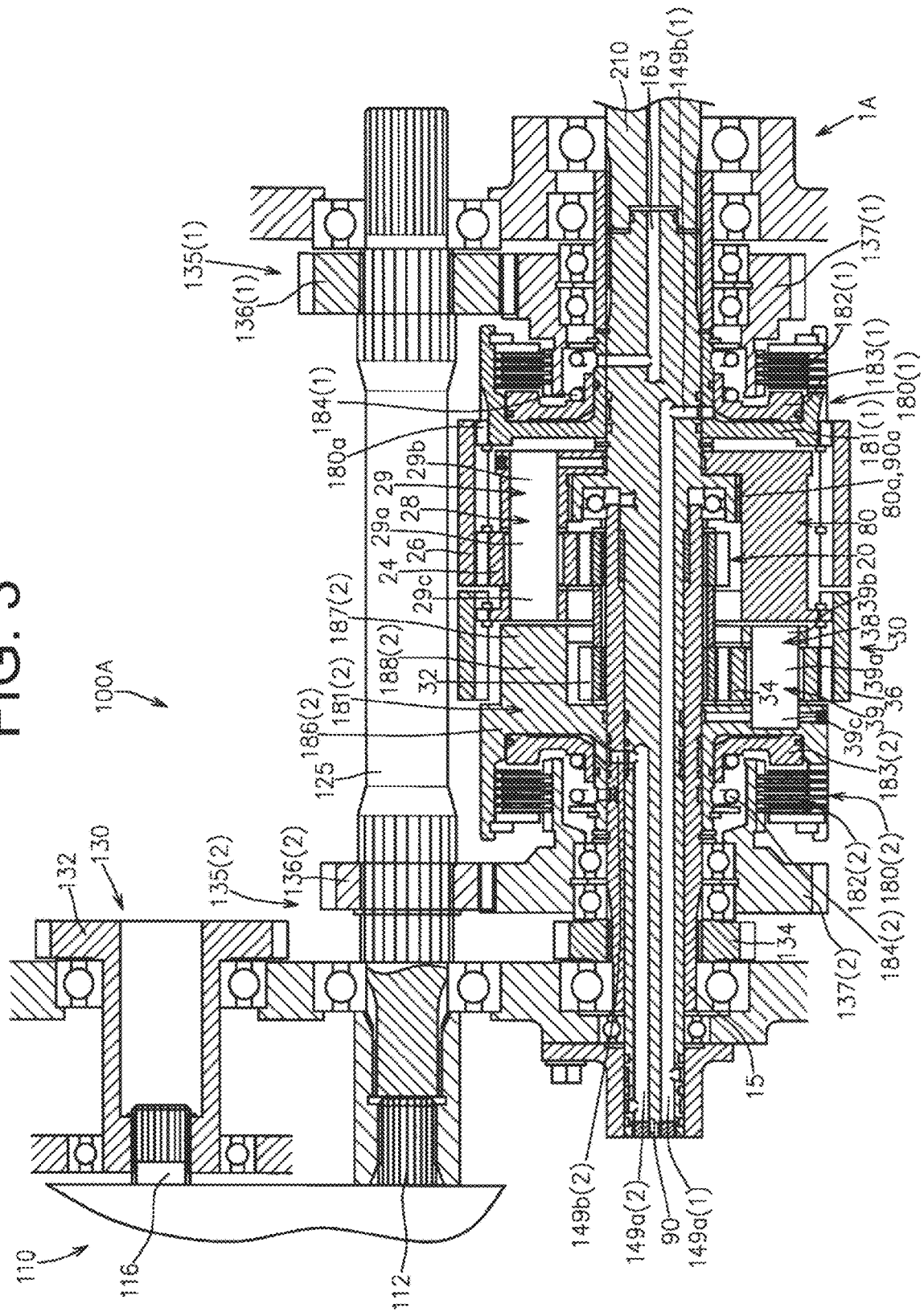
FIG. 3 is a partial longitudinal cross-sectional view of an HMT device including the planetary gear assembly according to the first embodiment.

FIG. 3 is a partial longitudinal cross-sectional view of the HMT device 100A including the planetary gear assembly 1A.

Figure 4:
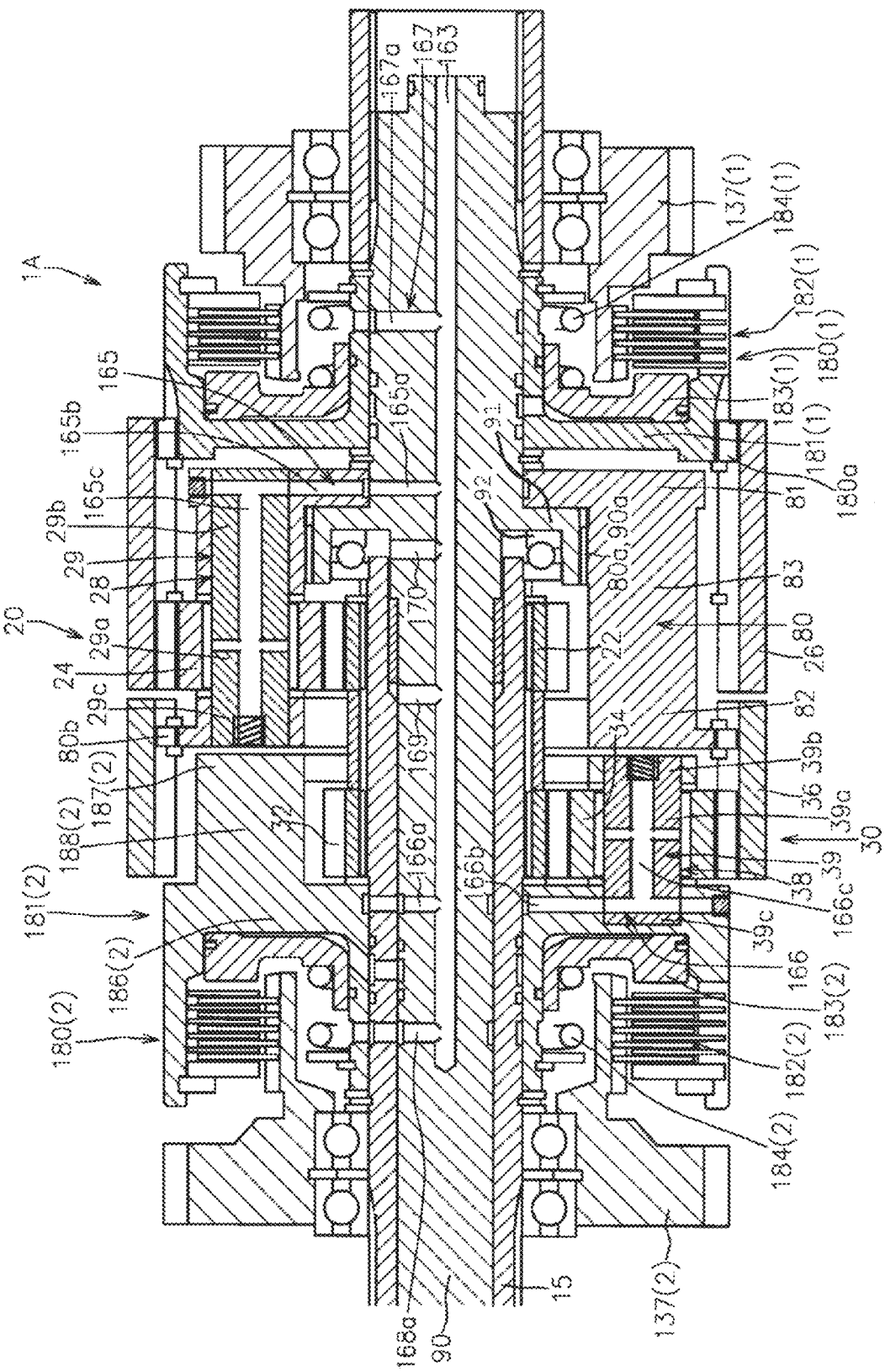
FIG. 4 is a longitudinal cross-sectional view of the planetary gear assembly according to the first embodiment.

FIG. 4 is a longitudinal cross-sectional view of the planetary gear assembly 1A.

As shown in FIG. 1 to FIG. 4, the planetary gear assembly 1A has a cylindrical transmission shaft 15, an output shaft 90 inserted into the transmission shaft 15, first and second planetary gear mechanisms 20, 30, and first and second clutch mechanisms 180(1), 180(2).

In the present embodiment, the HST output is operatively input to the transmission shaft 15.

In detail, the HST output is operatively input from the motor shaft 116 via an interlocked gear train 130 to the transmission shaft 15.

The interlocked gear train 130 has a drive gear 132 connected to the motor shaft 116 without a relative rotation about an axial line, and a driven gear 134 operatively meshed with the drive gear 132.

As shown in FIG. 1 and FIG. 3, the transmission shaft 15 is placed parallel to the motor shaft 116, supports the driven gear 134 without a relative rotation about an axial line, and supports the first planetary gear mechanism 20 on the first side in the axial direction from the driven gear 134 (on the side away from the motor shaft 116 in the axial direction, to the right in FIG. 1 and FIG. 3).

The output shaft 90 is longer than the transmission shaft 15, and in a state where at least the shaft portion on the downstream side of the power transmission (right side on the paper sheet) is extended outward from the end portion of the transmission shaft 15 (outward extended site), extrapolates and supports, in the shaft portion on the upstream side of the power transmission (left side on the paper sheet), the transmission shaft 15 with a free relative rotation about the shaft line.

As shown in FIG. 3 and FIG. 4, in the present embodiment, the output shaft 90, which has the first end side (right side in FIG. 3 and FIG. 4) on one side in the axial direction and the second end side (left side in FIG. 3) on the other side in the axial direction are defined as outward extended sites, is supported by bearing to a transmission case (not shown).

The first planetary gear mechanism 20, as shown in FIG. 3 and FIG. 4, includes a first sun gear 22, a first planetary gear 24 that meshes with the first sun gear 22, a first internal gear 26 that meshes with the first planetary gear 24, and a first carrier 28 that supports the first planetary gear 24 with a rotation about an axial line and that, in conjunction with the first planetary gear 24's revolution about the first sun gear 22, rotates about an axial line of the first sun gear 22, wherein the first sun gear 22, the first carrier 28 and the first internal gear 26 form planetary three elements.

As shown in FIG. 3 and FIG. 4, the first sun gear 22, which is the first element of the three planetary elements, is supported to the transmission shaft 15 without a relative rotation.

As described above, in the present embodiment, the HST output is input to the transmission shaft 15.

Thus, in the present embodiment, the first sun gear 22 acts as a variable power input unit to which the HST output is input.

The second element of the three planetary elements acts as the standard rotary speed power input unit to which the standard rotary speed power is input, and the third element acts as a composite output unit that outputs a composite rotary power (HMT power) that is a composite of the rotary power input to the first and second elements.

In the present embodiment, the first internal gear 26 and the first carrier 28 form the second element (standard rotary speed power input unit) and the third element (composite output unit) of the first planetary gear mechanism 20, respectively.

In the present embodiment, the HMT device 100A is provided with a drive shaft 125 to which the standard rotary speed power is operatively transmitted from the drive source 410, and the standard rotary speed power can be operatively input from the drive shaft 125 to the first internal gear 26.

In detail, as shown in FIG. 1 and FIG. 3, the drive shaft 125 is coaxially connected to the pump shaft 112 without a relative rotation about an axial line, and the HMT device 100A is provided with the drive shaft 125 and a first transmission gear train 135(1) that forms a power transmission path from the drive shaft 125 to the first internal gear 26.

In the present embodiment, as shown in FIG. 1 and FIG. 3, the first transmission gear train 135(1) has a first drive gear 136(1) supported to the drive shaft 125 without a relative rotation about an axial line, and a first driven gear 137(1), while being operatively meshed with the first drive gear 136(1), is supported to an outer extended site on the first end side of the output shaft 90 with a free relative rotation about an axial line.

The first clutch mechanism 180(1) is so configured as to engage and disengage the power transmission of the standard rotary speed power to and from the standard rotary speed power input unit of the first planetary gear mechanism 20.

As described above, in the present embodiment, the first internal gear 26 forms the standard rotary speed power input unit of the first planetary gear mechanism 20, and the first clutch mechanism 180(1) is so configured as to be placed coaxially with the transmission shaft 15 and the output shaft 90, and as to engage and disengage the power transmission from the first driven gear 137(1) to the first internal gear 26.

Further, the first clutch mechanism 180(1) may be so configured as to engage and disengage the power transmission from the first drive gear 136(1) which is positioned on the power transmission's upstream side relative to the first driven gear 137(1).

As shown in FIG. 1 to FIG. 3, in the present embodiment, the first clutch mechanism 180(1) is a hydraulic multi-disc friction clutch.

In detail, as shown in FIG. 3 and FIG. 4, the first clutch mechanism 180(1) has a first clutch housing 181(1) supported to an outward extended site on the first end side of the output shaft 90 with a free relative rotation about an axial line, a first friction plate group 182(1) including a first drive-side friction plate supported to the first driven gear 137(1) without a relative rotation, and a first driven-side friction plate, while being opposed to the first drive-side friction plate, supported to the first clutch housing 181(1) without a relative rotation, and a first piston 183(1) frictionally engages the first friction plate group 182(1) by the hydraulic oil supplied to the first clutch housing 181(1).

Further, the sign 184(1) in FIG. 3 and FIG. 4 is a return spring that biases the first piston 183(1) away from the first friction plate group 182(1); for frictionally engaging the first friction plate group 182(1), the first piston 183(1), by the force of the pressure oil, is pushed toward the first friction plate group 182(1) against the biasing force of the return spring 184(1).

The first clutch housing 181(1), without a relative rotation about an axial line, is connected to the first internal gear 26 which forms the standard rotary speed power input unit.

In the present embodiment, as shown in FIG. 3 and FIG. 4, the first clutch housing 181(1) is provided with an outer tooth portion 180a that meshes with the first internal gear 26.

The second planetary gear mechanism 30, as shown in FIG. 3 and FIG. 4, includes a second sun gear 32, a second planetary gear 34 that meshes with the second sun gear 32, a second internal gear 36 that meshes with the second planetary gear 34, and a second carrier 38 that supports the second planetary gear 34 with a rotation about an axial line and that, in conjunction with the second planetary gear 34's revolution about the second sun gear 32, rotates about an axial line of the second sun gear 32, wherein the second sun gear 32, the second carrier 38 and the second internal gear 36 form three planetary elements.

As shown in FIG. 3 and FIG. 4, the second sun gear 32 as the first element of the three planetary elements is supported to the transmission shaft 15 without a relative rotation.

As described above, in the present embodiment, the HST output is input to the transmission shaft 15.

Thus, in the present embodiment, the second sun gear 32 acts as a variable power input unit to which the HST output is input.

The second element of the three planetary elements acts as the standard rotary speed power input unit to which the standard rotary speed power is input, and the third element acts as a composite output unit that outputs a composite rotary power (HMT power) that is a composite of the rotary power input to the first and second elements.

In the present embodiment, the second carrier 38 and the second internal gear 36 form the second element (standard rotary speed power input unit) and third element (composite output unit) of the second planetary gear mechanism 30, respectively.

In the present embodiment, the standard rotary speed power is operatively input from the drive shaft 125 to the second carrier 38.

In detail, as shown in FIG. 1 and FIG. 3, the HMT device 100A is further provided with a second transmission gear train 135(2) that forms a power transmission path from the drive shaft 125 to the second carrier 38.

The second transmission gear train 135(2) has a second drive gear 136(2) that is supported to the drive shaft 125 without a relative rotation about an axial line, and a second driven gear 137(2) that, while being meshed with the second drive gear 136(2), is supported to the transmission shaft 15 with a free relative rotation about an axial line.

The second clutch mechanism 180(2) is so configured as to engage and disengage the power transmission of the standard rotary speed power to and from the standard rotary speed power input unit of the second planetary gear mechanism 30.

As described above, in the present embodiment, the second carrier 38 forms the standard rotary speed power input unit of the second planetary gear mechanism 30, and the second clutch mechanism 180(2) is so configured as to be placed coaxially with the transmission shaft 15 and the output shaft 90, and as to engage and disengage the power transmission from the second driven gear 137(2) to the second carrier 38.

Further, the second clutch mechanism 180(2) may be so configured as to engage and disengage the power transmission from the second drive gear 136(2) which is positioned on the power transmission's upstream side relative to the second driven gear 137(2).

As shown in FIG. 1 to FIG. 3, in the present embodiment, the second clutch mechanism 180(2) is also as a hydraulic multi-disc friction clutch.

In detail, as shown in FIG. 3 and FIG. 4, the second clutch mechanism 180(2) has a second clutch housing 181(2) supported to the transmission shaft 15 with a free relative rotation about an axial line, a second friction plate group 182(2) including a second drive-side friction plate supported to the second driven gear 136(2) without a relative rotation, and a second driven-side friction plate, while being opposed to the second drive-side friction plate, supported to the second clutch housing 181(2) without a relative rotation, and a second piston 183(2) frictionally engages the second clutch housing 182(2). Further, the sign 184(2) in FIG. 3 and FIG. 4 is a return spring that biases the second piston 183(2) away from the second friction plate group 182(2); for frictionally engaging the second friction plate group 182(2), the second piston 183(2), by the force of the pressure oil, is pushed toward the second friction plate group 182(2) against the biasing force of the return spring 184(2).

The second clutch housing 181(2), without a relative rotation about an axial line, is connected to the second carrier 38 which forms the standard rotary speed power input unit.

In the present embodiment, as shown in FIG. 3 and FIG. 4, the second carrier 38 has a second carrier pin 39.

The second carrier pin 39 has an intermediate site 39a that supports the second planetary gear 34, and first and second extended sites 39b and 39c that extend from the intermediate site 39a to one side and the other side in the axial direction, respectively.

The second clutch housing 181(2) has an annular body portion 186(2) which is extrapolated and supported to the transmission shaft 15 with a free relative rotation about an axial line, an annular end wall portion 187(2) which is opposite the body portion 186(2) across the second planetary gear 34 in the axial direction, and a connection portion 188(2) which, while allowing space for placing the first planetary gear 24, connects the body portion 186(2) and the end wall portion 187(2).

The end wall portion 187(2) is provided with a first engaging hole in which the first extended site 39b of the second carrier pin 39 is engaged, and the body portion 186(2) is provided with a second engaging hole in which the second extended site 39c of the second carrier pin 39 is engaged.

Further, the second driven-side friction plate is supported to the body portion 186(2) without a relative rotation.

As shown in FIG. 1 to FIG. 4, the planetary gear assembly 1A is further provided with a connection member 80 which is extrapolated to the transmission shaft 15 with a free relative rotation about an axial line.

The connection member 80, connects, without a relative rotation about an axial line, among the three planetary elements in the first planetary gear mechanism 20, the composite output unit other than the first sun gear 22 and the planetary element that forms the standard rotary speed power input unit, and among the three planetary elements in the second planetary gear mechanism 30, the composite output unit other than the second sun gear 32 and the planetary element that forms the standard rotary speed power input unit; and the connection member 80, meanwhile, is non-rotatable relative to the output shaft 90 about an axial line.

As described above, in the present embodiment, the first sun gear 22 forms the variable power input unit to which the HST power is input and the first internal gear 26 forms the standard rotary speed power input unit, and the first carrier 28 forms the composite output unit in the first planetary gear mechanism 20.

Further, the second sun gear 32 forms the variable power input unit to which the HST power is input and the second carrier 38 forms the standard rotary speed power input unit, and the second internal gear 36 forms the composite output unit in the second planetary gear mechanism 30.

Thus, the connection member 80 is so configured as to be non-rotatable relative to the output shaft 90, in a state where the first carrier 28 as the composite output unit in the first planetary gear mechanism 20, and the second internal gear 36 as the composite output unit in the second planetary gear mechanism 30 are connected without a relative rotation around the shaft line.

The connection member 80 acts as a composite rotary power transmitting member that transmits, to the output shaft 90, the composite rotary power of the first planetary gear mechanism 20 and the composite rotary power of the second planetary gear mechanism 30.

Figure 5:
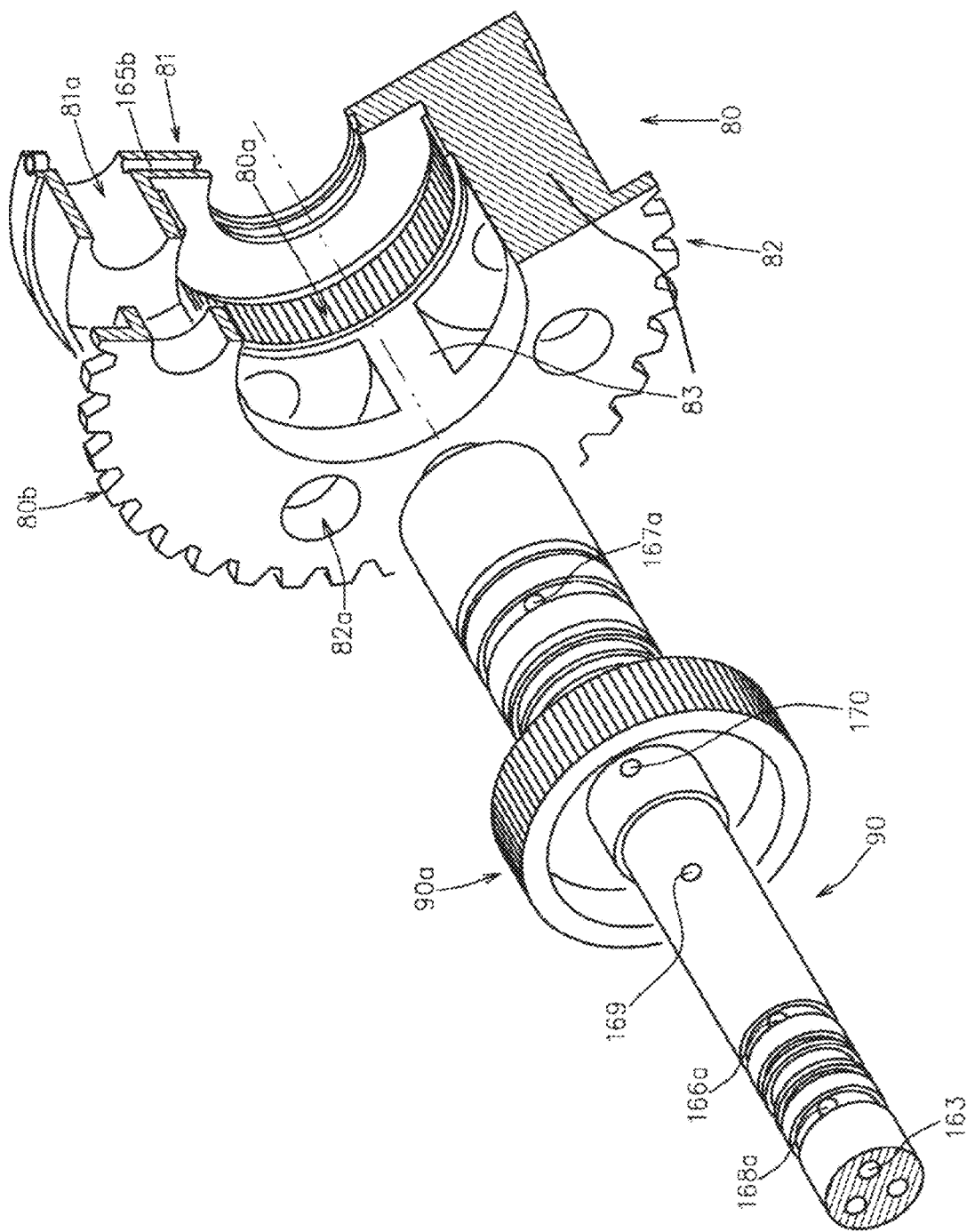
FIG. 5 is an exploded perspective view of an output shaft and connection member in the planetary gear assembly according to the first embodiment.

FIG. 5 shows an exploded perspective view of the output shaft 90 and connection member 80.

As shown in FIG. 3 to FIG. 5, the output shaft 90 has a radial enlarged portion 91 integrally formed in the middle position in the axial direction. The first end portion of the transmission shaft 15 faces one side of the radial enlarged portion 91, and is supported via a thrust bearing 92. The outer peripheral face of the radial enlarged portion 91 has a male spline-shaped engaging portion 90a that opens outward in the radial direction and is circumferentially arranged.

Further, as shown in FIG. 3 and FIG. 4, the first carrier 28 has a first carrier pin 29.

The first carrier pin 29 has an intermediate site 29a that supports the first planetary gear 24, and first and second extended sites 29b and 29c that extend from the intermediate site 29a to one side and the other side in the axial direction, respectively.

The connection member 80 is in a cylindrical shape that, on an inner peripheral face thereof, has a female spline-shaped engaging portion 80a that engages with the engaging portion 90a, which is formed on the radial enlarged portion 91 of the output shaft 90, thereby to secure the output shaft 90 without a relative rotation, and on an outer peripheral face thereof, has an outer tooth portion 80b that engages with the second internal gear 36 that acts as the composite output unit of the second planetary gear mechanism 30. Knurling, keys or press-fitting, bake-fitting or cool-fitting other than the spline, may be used as specific means for the engaging portions 80a and 90a. When the spline or key is employed, disassembling and assembling of the connection member 80 and the output shaft 90 is easier.

As shown in FIG. 5, the connection member 80 has a body portion 81 and an end wall portion 82 which are positioned on one side and the other side in the axial direction, respectively, and a connection portion 83 positioned between the body portion 81 and the end wall portion 82 in the axial direction.

The body portion 81 is formed with a first engaging hole 81a (see FIG. 5) into which the first extended site 29b of the first carrier pin 29 is inserted. The end wall portion 82 is formed with a second engaging hole 82a (see FIG. 5) into which the second extended site 29c of the first carrier pin 29 is inserted.

The connection portion 83 connects the body portion 81 and the end wall portion 82, while defining space, which is for placing the planetary gear 24 supported to the intermediate site 29a of the first carrier pin 29, between the body portion 81 and the end wall portion 82.

Further, in the present embodiment, as shown in FIG. 5, the engaging portion 80a is formed on the inner peripheral face of the opening provided on the rotary center side of connection portion 83, and the outer tooth portion 80b is formed on the outer peripheral face of the end wall portion 82.

As shown in FIG. 2, the first and second clutch mechanisms 180(1), 180(2) are so configured as to engage and disengage the power transmission by first and second clutch actuated members 145(1), 145(2), respectively, which are operatively controlled by the control unit 300.

That is, the transmission structure 200A is further provided with the first clutch actuated member 145(1) that switches the engaging and disengaging actuation of the first clutch mechanism 180(1), and the second clutch actuated member 145(2) that switches the engaging and disengaging actuation of the second clutch mechanism 180(2); the control unit 300 is so configured as to control the actuation of the first and second clutch actuated members 145(1), 145(2) in addition to the actuating control of the HST actuated member 320.

In the present embodiment, the first and second clutch actuated members 145(1), 145(2) are hydraulic actuators.

In detail, as shown in FIG. 2, the first clutch actuated member 145(1) has an oil supply line 146 with an upstream side fluidly connected to a hydraulic source 430 such as a hydraulic pump, a drain line 147, a first supply/discharge line 148(1) that supplies and discharges pressure oil to and from the first clutch mechanism 180(1), a first clutch solenoid valve 150(1).

As shown in FIG. 3, the first supply/discharge line 148(1) has a first axial oil path 149a(1) formed in the output shaft 90, and a first radial oil path 149b(1) so formed that one end portion is fluidly connected to the first axial oil path 149a(1) and the other end portion is so formed in the output shaft 90 as to be fluidly connected to a pressure oil chamber of the first clutch mechanism 180(1).

A relative rotary difference is caused to between the output shaft 90 and the first clutch housing 181(1); thus, an annular groove is formed in any of the inner and outer peripheral faces of the contact thereof, and the first radial oil path 149b(1), by being caused to be via the annular groove, establishes an oil path that avoids a separation despite the relative rotary difference being caused.

The first clutch solenoid valve 150(1) is so configured as to selectively take in response to a signal from the control unit 300, a clutch engaged position that fluidly connects the first supply/discharge line 148(1) to the oil supply line 146 and a clutch shut-off position that fluidly connects the first supply/discharge line 148(1) to the drain line 147.

The second clutch actuated member 145(2) has the oil supply line 146, the drain line 147, a second supply/discharge line 148(2) that supplies and discharges pressure oil to and from the second clutch mechanism 180(2), and a second clutch solenoid valve 150(2).

As shown in FIG. 3, the second supply/discharge line 148(2) has a second axial oil path 149a(2) formed in the output shaft 90, and a second radial oil path 149b(2) so formed that one end portion is fluidly connected to the second axial oil path 149a(2) and the other end portion is so formed in the output shaft 90 and the transmission shaft 15 as to be fluidly connected to the pressure oil chamber of the second clutch mechanism 180(2).

A relative rotary difference is caused to between the output shaft 90 and the transmission shaft 15, and to between the transmission shaft 15 and the second clutch housing 181(2); thus, an annular groove is formed in any of the inner and outer peripheral faces of each contact thereof thereby to form a double placement, and the second hydraulic oil radial oil path 149b(2), by being caused to be via these annular grooves, establishes an oil path that avoids a separation despite the relative rotary difference being caused.

The second clutch solenoid valve 150(2) is so configured as to selectively take in response to a signal from the control unit 300, the clutch engaged position in which the second supply/discharge line 148(2) is fluidly connected to the oil supply line 146 and the clutch shut-off position in which the second supply/discharge line 148(2) is fluidly connected to the drain line 147.

The code 146a in FIG. 2 is a first pressure regulating relief valve that sets a clutch actuating hydraulic pressure of the oil supply line 146 to a given pressure.

In the present embodiment, the first and second clutch solenoid valves 150(1), 150(2) are proportional pressure valves so as to absorb, by friction clutch's slippage, the rotary difference caused at the time of a clutch switching; in place of this, when the power transmission ratio can be so set that a bodily shock is within an allowable level with almost no rotary difference described above, the first and second clutch solenoid valves 150(1), 150(2) may be inexpensive and simple-to-control directional switching valves.

In the present embodiment, the first and second clutch actuated members 145(1), 145(2) are hydraulic actuators for actuating a hydraulic multi-disc friction clutch; however, when the power transmission ratio can be set to the above state with almost no rotary difference, for example, the first and second clutch mechanisms 180(1), 180(2) may be configured in the form of a dog clutch which has fewer parts and is less expensive than the hydraulic multi-disc friction clutch. Further, the first and second clutch actuated members 145(1), 145(2), which shift and operate it, may be electric motors or other electric actuators.

As described above, in the present embodiment, the transmission structure 200A has the forward and rearward switch mechanism 220 for switching the forward direction of the vehicle.

In this case, the transmission structure 200A is further provided with a forward and rearward actuated member 155 that actuates the forward and rearward switch mechanism 220, apart from the speed-change operated member 310.

The speed-change operated member 310 is manually operable in the forward-side shift range from the 0 speed position to the forward-side maximum speed position and in the rearward-side shift range from the 0 speed position to the rearward-side maximum speed position.

Then, the control unit 300 actuates the forward and rearward actuated member 155 so that the forward and rearward switch mechanism 220 is in a forward rotary output state (forward output state) when the speed-change operated member 310 is positioned in the forward-side shift range and the forward and rearward switch mechanism 220 is in a reverse rotary output state (rearward output state) when the speed-change operated member 310 is positioned in the rearward-side shift range.

Further, the transmission structure 200A may be provided with a forward and rearward switch operated member for human operation of the forward and rearward switch mechanism 220. In this case, the forward and rearward switch operated member may be of various configurations, such as a lever or electric switch type that is mechanically or electrically operably connected to the forward and rearward switch mechanism 220.

When the forward and rearward switch operated member is provided, the speed-change operated member 310 is, for example, a pedal member operable from the 0 speed position to the maximum speed position, and the transmission structure 200A is so configured as to output a drive power from the 0 speed to the forward-side maximum speed and from the 0 speed to the rearward-side maximum speed in response to the human operation on the speed-change operated member 310 and the forward and rearward change operation member.

The forward and rearward actuated member 155 can take various modes, such as a hydraulic actuator or an electric actuator, as long as the forward and rearward switch mechanism 220 can be actuated by the control signal from the control unit 300.

In the present embodiment, as shown in FIG. 2, the forward and rearward actuated member 155 is also a hydraulic actuator.

As shown in FIG. 1, the forward and rearward switch mechanism 220 is so configured as to switch the rotary direction of the HMT output, in the forward and rearward directions, between the middle drive shaft 210 which operatively inputs the HMT output from the output shaft 90, and the run output shaft 215 which is operatively connected to the differential mechanism 230.

In the present embodiment, the forward and rearward switch mechanism 220 includes a forward-side gear train 330F that includes: a forward-side drive gear 331F supported to the middle drive shaft 210, and a forward-side driven gear 332F which is supported to the run output shaft 215 and is meshed with the forward-side drive gear 331F; a rearward-side gear train 330R that includes a rearward-side drive gear 331R supported to the middle drive shaft 210, and a rearward-side driven gear 332R which is supported to the run output shaft 215 and is meshed with the rearward-side drive gear 331R via an idle gear 333; a forward-side clutch mechanism 340F to engage and disengage the power transmission of the forward-side gear train 330F; and a rearward-side clutch mechanism 340R to engage and disengage the power transmission of the rearward-side gear row 330R.

As shown in FIG. 2, the forward and rearward actuated member 155 is provided with the oil supply line 146, the drain line 147, the forward supply/discharge line 156F that supplies and discharges the pressure oil to and from the forward-side clutch mechanism 340F, the rearward supply/discharge line 156R that supplies and discharges the pressure oil to and from the rearward-side clutch mechanism 340R, a forward solenoid valve 157F, and a rearward solenoid valve 158R.

The forward solenoid valve 157F is so configured as to selectively take in response to the signal from the control unit 300, the clutch engaged position that fluidly connects the forward supply/discharge line 156F to the oil supply line 146 and the clutch shut-off position that fluidly connects the forward supply/discharge line 156F to the drain line 147.

Similarly, the rearward solenoid valve 157R is so configured as to selectively take in response to the signal from the control unit 300, the clutch engaged position that fluidly connects the rearward supply/discharge line 156R to the oil supply line 146 and the clutch shut-off position that fluidly connects the rearward supply/discharge line 156R to the drain line 147.

In the present embodiment, the transmission structure 200A is provided with a lubricant supply structure.

As shown in FIG. 2 to FIG. 4, the lubricant supply structure has a lubricant supply line 161 that receives, from the first pressure regulating relief valve 146a, the discharged oil at the time of the pressure regulating actuation, and a lubricant guide line 162 that guides the oil, which is received from the lubricant supply line 161, to lubricated sites such as a friction plate and bearing of the forward and rearward switch mechanism 220.

As shown in FIG. 3 and FIG. 4, the lubricant guide line 162 has a lubricant axial line path 163 so formed from the middle drive shaft 210 to across the output shaft 90 as to receive the oil from the lubricant supply line 161, and a plurality of lubricant guide paths which, when the lubricant flows in the lubricant axial line path 163, guides the lubricant to a plurality of lubricated sites arranged on the axial line.

As shown in FIG. 4, the lubricant guide paths include a first planetary gear lubricant guide path 165 for the first planetary gear mechanism 20, a second planetary gear lubricant guide path 166 for the second planetary gear mechanism 30, a first clutch lubricant guide path 167 for the first clutch mechanism 180(1), and a second clutch lubricant path 168 for the second clutch mechanism 180(2).

As shown in FIG. 4, the first planetary gear lubricant guide path 165 has a first planetary gear lubricant takeout path 165a so formed in the output shaft 90 that one end portion is fluidly connected to the lubricant axial line path 163 and the other end portion is open to the outer surface of the radial enlarged portion 91, a first oil path 165b (see FIG. 5) so formed in the body portion 81 that one end portion is fluidly connected to the first planetary gear lubricant takeout path 165a and the other end portion is open to the first engaging hole 81a, and a first pin oil path 165c that receives the lubricant from the first oil path 165b and guides the lubricant to a desired lubrication site.

In the present embodiment, the first pin oil path 165c is so configured as to release the lubricant from the outer peripheral face of an intermediate site 29a of the first carrier pin 29, which supports the first planetary gear 24, to a bearing bush of the first planetary gear 24.

As shown in FIG. 4, the second planetary gear lubricant guide path 166 has a second planetary gear lubricant takeout path 166a so formed in the output shaft 90 and the transmission shaft 15 that one end portion is fluidly connected to the lubricant axial line path 163 and the other end portion is open to the outer surface of the portion which is of the transmission shaft 15 and which supports the body portion 186(2) of the second clutch housing 181(2), a second oil path 166b so formed in the body portion 186(2) that one end portion is fluidly connected to the second planetary gear lubricant takeout path 166a and the other end portion is open to a second engaging hole of the body portion 181(2), and a second pin oil path 166c that receives the lubricant from the second oil path 166b and guides the lubricant to the desired lubrication site.

Further, a relative rotary difference is caused to between the output shaft 90 and the transmission shaft 15, and to between the transmission shaft 15 and the second clutch housing 181(2); thus an annular groove is formed in any of the inner and outer peripheral faces of each contact thereof thereby to form a double placement, and the second takeout oil path 166a, by being caused to be via these annular grooves, is connected to the second oil path 166b without a separation despite the relative rotary difference being caused.

In the present embodiment, the second pin oil path 166c is so configured as to release the lubricant from the outer peripheral face of the intermediate site 39a of the second carrier pin 39, which supports the second planetary gear 34, to the bearing bush of the second planetary gear 34.

The first clutch lubricant guide path 167 has a first clutch lubricant takeout path 167a so formed in a placement cylinder portion and the output shaft 90 that one end portion is fluidly connected to the lubricant axial line path 163 and the other end portion is open on the outer surface of the portion which is of the radial enlarged portion 91 and which supports the placement cylinder portion of the first clutch housing 181(1), thereby to release the oil through the placement cylinder portion in the direction of a friction plate of the first clutch.

A relative rotary difference is caused to between the output shaft 90 and the first clutch housing 181(1); thus, an annular groove is formed in any of the inner or outer face of the contact thereof, and the lubricant takeout path 167a, by being caused to pass through the annular groove, establishes an oil path that avoids a separation despite the relative rotary difference being caused.

The second clutch lubricant guide path 168 has a linear second clutch lubricant takeout path 168a that is so formed in the output shaft 90 and the transmission shaft 15 that one end portion is fluidly connected to the lubricant axial line path 163 and the other end portion is open to the outer surface of the portion which is of the transmission shaft 15 and which supports the placement cylinder portion of the body portion 186(2) of the second clutch housing 181(2), thereby to release the oil through the placement cylinder portion in the direction of the friction plate of the second clutch.

A relative rotary difference is caused to between the output shaft 90 and the transmission shaft 15, and to between the transmission shaft 15 and the second clutch housing 181(2); thus, an annular groove is formed in any of the inner and outer peripheries of each contact thereof thereby to form a double placement, and the lubricant takeout path 168a, by being caused to be via these annular grooves, establishes an oil path that avoids a separation despite the relative rotary difference being caused.

As shown in FIG. 4, in the present embodiment, the lubricant axial line path 163 further has a transmission shaft lubricant guide path 169 that guides the lubricant to a bearing bush interposed to between the transmission shaft 15 and the output shaft 90, and a thrust bearing lubricant guide path 170 that guides the lubricant to the thrust bearing 92 placed between the radial enlarged portion 91 and the first end portion of the transmission shaft 15.

The code 161a in FIG. 2 is a second pressure regulating relief valve that sets the lubricant pressure in the lubricant supply line 161.

The set gear ratios of the first and second planetary gear mechanisms 20, 30 are described here.

Figure 6:
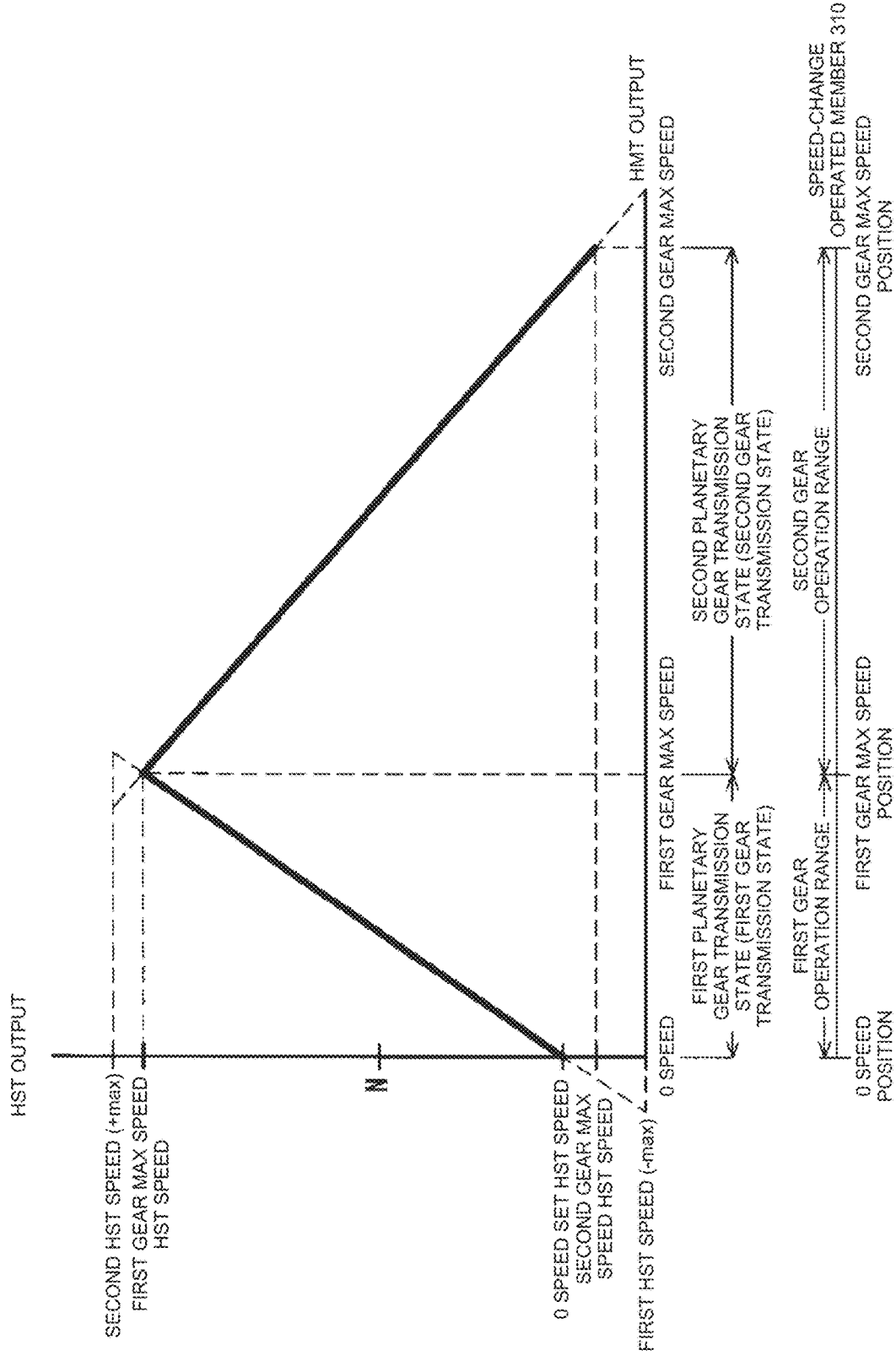
FIG. 6 is a graph showing the relation between the HST output and the HMT output in the HMT device including the planetary gear assembly according to the first embodiment.

FIG. 6 is a graph showing the relation, in the HMT device 100A, between the HST output (rotary speed of the motor shaft 116) and the HMT output (rotary speed of the output shaft 90).

As shown in FIG. 6, the first planetary gear mechanism 20 so sets the gear ratio that, in a first planetary gear transmission state (first gear transmission state) in which the HST output is input to the first sun gear 22 and the standard rotary speed power is input to the first internal gear 26, the HST output generated at the first carrier 28 (that is, the connection member 80 and the output shaft 90) becomes a 0 speed when the HST output is set to a 0 speed set HST speed, then, the HMT output generated at the first carrier 28 rotates at an increased speed in the first rotary direction as one side about the axial line as the HST output is changed from the first HST speed's side to the second HST speed's side, and then, the HMT output generated at the first carrier 28 rotates at a given first gear maximum speed in the first rotary direction when the HST output is set to a given first gear maximum speed HST speed.

In the present embodiment, the 0 speed set HST speed is a speed that is changed, by a given speed, to the second HST speed's side from the first HST speed which is one speed end of the variable range of the HST output.

This is due to the following reason.

That is, theoretically, it is possible to set the 0 speed set HST speed as the first HST speed; in this case, however, depending on the run load, etc. of the work vehicle, a situation may arise where the HST output fails to reach the first HST speed even by positioning the output adjusting member 120 in a first actuation end position that corresponds to the first HST speed.

In view of this, the control unit 300 sets, as the 0 speed set HST speed, the speed that is changed, by the given speed, from the first HST speed, which is the one speed end of the variable range of the HST output, to the second HST speed's side.

For the same reason, in the present embodiment, the control unit 300 sets, as the first gear maximum speed HST speed, the speed that is changed, by a given speed, from the second HST speed, which is the other speed end of the variable range of the HST output, to the first HST speed's side.

That is, in the present embodiment "max gear HST speed" refers to an adjusted output value limited by the control unit 300, not a mechanically limited output value of the HST 110.

As shown in FIG. 6, the second planetary gear mechanism 30 so sets the gear ratio that, in a second planetary gear transmission state (second gear transmission state) in which the HST output is input to the second sun gear 32 and the standard rotary speed power is input to the second carrier 38, the HMT output generated at the second internal gear 36 (that is, the connection member 80 and the output shaft 90) is the first gear maximum speed when the HST output is set to the first gear maximum speed HST speed, then, the HMT output generated at the second internal gear 36 is increased in the first rotary direction, which is one side about the axial line, as the HST output is changed from the second HST speed's side to the first HST speed's side, and then, the HMT output generated at the second internal gear 36 rotates at a given second gear maximum speed in the first rotary direction when the HST output is set to a given second gear maximum speed HST speed.

In the present embodiment, the second gear maximum speed HST speed is also the speed that is changed, by a given speed, to the second HST speed's side from the first HST speed which is one speed end of the variable range of the HST output.

Figure 7:
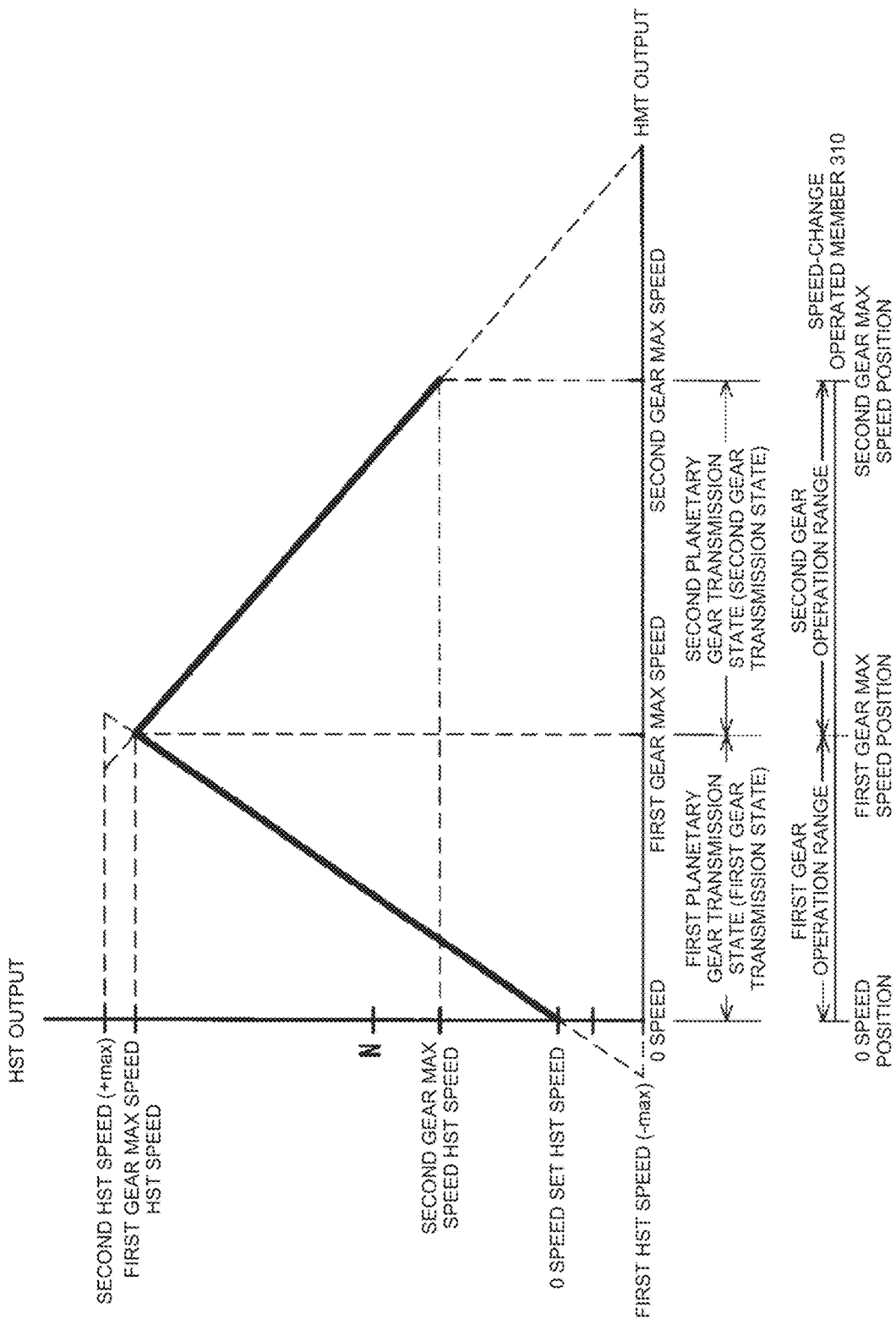
FIG. 7 is a graph showing the relation between the HST output and the HMT output in a modified example of the HMT device that includes the planetary gear assembly according to the first embodiment.

When the vehicle's maximum speed that may be output in the second planetary gear transmission state (second gear transmission state) is too fast relative to the specification of the work vehicle, the control unit 300 may set, as the second gear maximum speed HST speed, the speed significantly changed from the first HST speed to the second HST speed's side (preferably, to the neutral position N or to near the neutral position N), as shown in FIG. 7.

In the present embodiment, the control unit 300 is so configured as to perform the following control thereby to generate the HMT output in FIG. 6.

That is, the transmission structure 200A is further provided with an output sensor 50 (see FIG. 1) that directly or indirectly detects the rotary speed of the output shaft 90.

In the present embodiment, the output sensor 50 detects the rotary speed of the output shaft 90 at the tip face site of the output shaft 90, but alternatively, the output sensor 50 may be so placed as to detect the rotary speed of the connection member 80.

As shown in FIG. 6, the shift range of the speed-change operated member 310 is divided into a first gear shift range on the low-speed side and a second gear shift range on the high speed side than the first gear shift range.

The first gear shift range is set in the range from the 0 speed position to a first gear maximum speed position, and the second gear shift range is set in the range from the first gear maximum speed position to a second gear maximum speed position.

The control unit 300 executes the following actuating control for the first and second clutch actuated members 145(1), 145(2).

That is, the control unit 300, (1) when determining, based on the signal from the shift position sensor 315, that the speed-change operated member 310 is operated in the first gear shift range, actuates the first and second clutch actuated members 145(1), 145(2), so that the first gear transmission state, which is generated by engaging the first clutch mechanism 180(1) and disengaging the second clutch mechanism 180(2), is acquired, (2) when determining, based on the signal from the shift position sensor 315, that the speed-change operated member 310 is positioned in the first gear maximum speed position, actuates the first and second clutch actuated members 145(1), 145(2), so that one of the first and second clutch mechanisms 180(1), 180(2) is engaged and the other is shut off, and (3) when determining, based on the signal from the shift position sensor 315, that the speed-change operated member 310 is operated in the second gear shift range, actuates the first and second clutch actuated members 145(1), 145(2), so that the second gear transmission state, which is generated by shutting off the first clutch mechanism 180(1) and engaging the second clutch mechanism 180(2), is acquired.

Further, the control unit 300 executes the following actuating control for the HST actuated member 320.

That is, based on the signal from the shift position sensor 315, the control unit 330, (1) when determining that the speed-change operated member 310 is operated to the 0 speed position, sets the HST output to the 0 speed set HST speed, (2) when determining that the speed-change operated member 310 is operated to increase the speed within the first gear shift range, changes the HST output from the first HST speed's side to the second HST speed's side, (3) when determining that the speed-change operated member 310 is shifted to the first gear maximum speed position, actuates the HST actuated member 320 so that the HST output becomes the first gear maximum speed HST speed, (4) when determining that the speed-change operated member 310 is operated to increase the speed within the second gear shift range, changes the HST output from the second HST speed's side to the first HST speed's side, and (5) when determining that the speed-change operated member 310 is shifted to the maximum speed position, sets the HST output to the second gear maximum speed HST speed.

Further, the control unit 300 performs the following actuating control for the forward and rearward actuated member 155.

That is, based on the signal from the shift position sensor 315, the control unit 300, (1) when determining that the speed-change operated member 310 is positioned in the forward-side shift range, puts the forward and rearward switch mechanism 220 in the forward rotary output state, and (2) when determining that the speed-change operated member 310 is positioned in the rearward-side shift range, puts the forward and rearward switch mechanism 220 in the reverse rotary output state.

As described above, in the present embodiment, the first clutch mechanism 180(1) is placed coaxially with the transmission shaft 15 positioned downstream of the power transmission, so that the power transmission can be engaged and disengaged from the first driven gear 137(1) to the standard rotary speed power input unit of the first planetary gear mechanism 20 (the first internal gear 26 in the present embodiment), and the second clutch mechanism 180(2) is also placed coaxially with the transmission shaft 15 positioned downstream of the power transmission, so that the power transmission can be engaged and disengaged from the second driven gear 137(2) to the standard rotary speed power input unit of the second planetary gear mechanism 30 (in the present embodiment, the second carrier 38).

The effect of placing the first and second clutch mechanisms 180(1), 180(2) in the above manner will be described herein.

Figure 8:
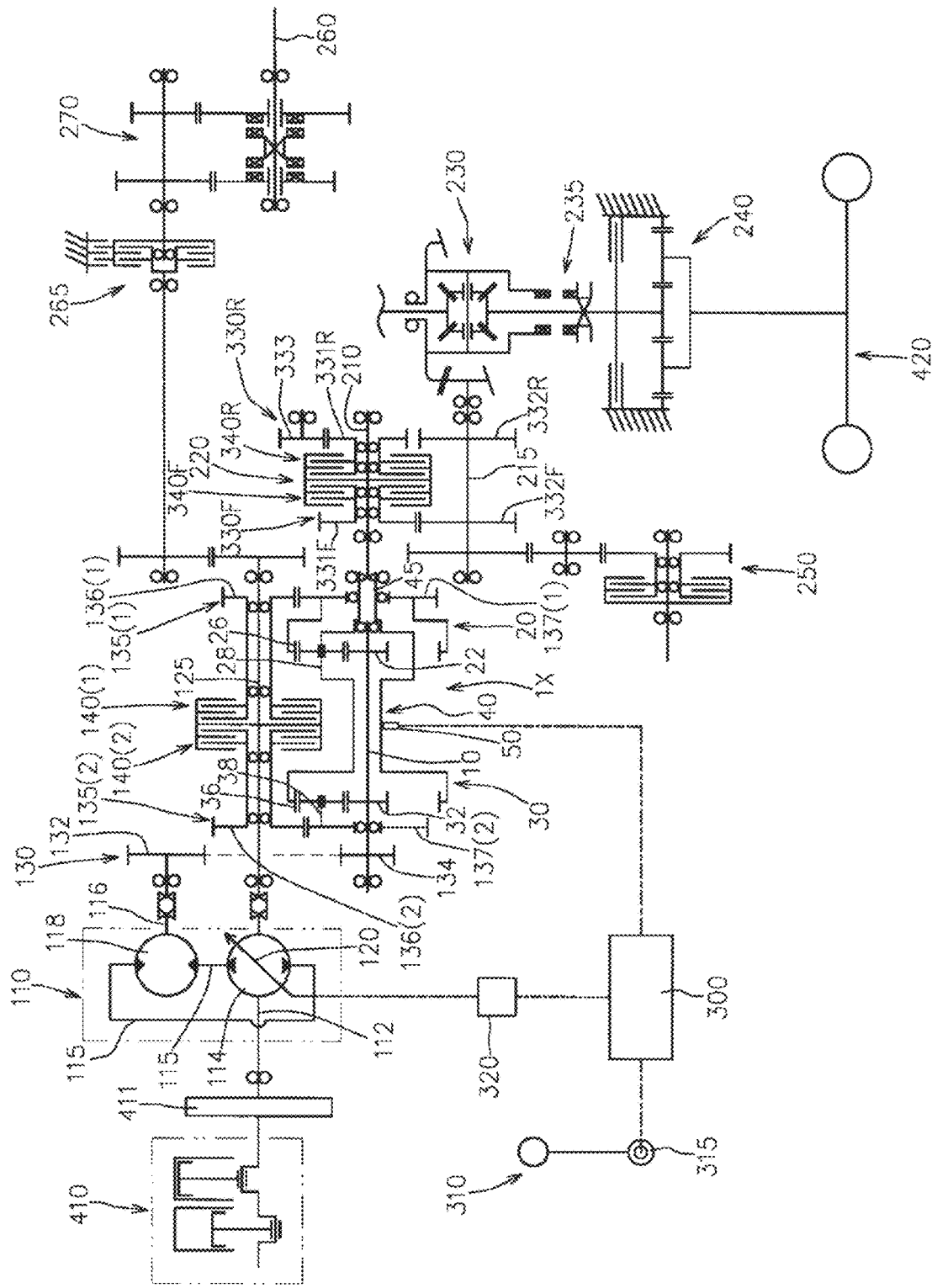
FIG. 8 is a schematic diagram of transmission of a transmission structure of the work vehicle to which the planetary gear assembly according to a comparative example is applied.

FIG. 8 is a schematic diagram of the transmission of the work vehicle to which a planetary gear assembly 1X according to a comparative example is applied.

In the planetary gear assembly 1X; on the drive shaft 125, there are placed a first clutch mechanism 140(1) that engages and disengages the first planetary gear mechanism 20's transmission of the standard rotary speed power to the standard rotary speed power input unit, and a second clutch mechanism 140(2) that engages and disengages the second planetary gear mechanism 30's transmission of the standard rotary speed power to the standard rotary speed power input unit.

In FIG. 8, the same sign is given to the same member as in the present embodiment.

In detail, as shown in FIG. 8, the planetary gear assembly 1X has a transmission shaft 10 to which the HST output can be operatively input, the drive shaft 125, the first planetary gear mechanism 20 including the first sun gear 22 supported to the transmission shaft 10 without a relative rotation about an axial line, the second planetary gear mechanism 30 including the second sun gear 32 supported to the transmission shaft 10 without a relative rotation about an axial line, the first transmission gear train 135(1) capable of operatively transmitting the standard rotary speed power from the drive shaft 125 to the standard rotary speed power input unit (the first internal gear 26 in the configuration shown in FIG. 8) of the first planetary gear mechanism 20, the second transmission gear train 135(2) capable of operatively transmitting the standard rotary speed power from the drive shaft 125 to the standard rotary speed power input unit (the second carrier 38 in the configuration shown in FIG. 8) of the second planetary gear mechanism 30, the connection member 40 that connects the first planetary gear mechanism 20's composite output unit (the first carrier 28 in the configuration shown in FIG. 8) and the second planetary gear mechanism 30's composite output unit (the second internal gear 36 in the configuration shown in FIG. 8) without a relative rotation about an axial line, an output shaft 45 connected to the connection member 40 without a relative rotation about an axial line, the first clutch mechanism 140(1) so supported to the drive shaft 125 as to engage and disengage the power transmission from the drive shaft 125 to the first drive gear 136(1) of the first transmission gear train 135(1), and the second clutch mechanism 140(2) so supported to the drive shaft 125 as to engage and disengage the power transmission from the drive shaft 125 to the second drive gear 136(2) of the second transmission gear train 135(2).

In the planetary gear assembly 1X, the first clutch mechanism 140(1) is placed between the drive shaft 125 which is upstream in the transmission direction, and the first drive gear 136(1) supported to the drive shaft 125 with a free relative rotation about an axial line, and the second clutch mechanism 140(2) is placed between the drive shaft 125 which is upstream in the transmission direction, and the second drive gear 136(2) supported to the drive shaft 125 with a free relative rotation about an axial line.

Thus, in the planetary gear assembly 1X; when one clutch mechanism (e.g., the first clutch mechanism 140(1)) is engaged, the drive gear on the non-engaged side (the second drive gear 136(2) in the present example) is driven in reverse by the driven gear (the second driven gear 137(2) in the present example) that receives the rotation of the connection member 40.

In this case, the relative rotary difference, between the drive gear on the non-engaged side (the second drive gear 136(2) in the present example) and the drive shaft 125, exceeding the allowable value may cause an abnormal wear or a seizure.

In contrast, in the planetary gear assembly 1A of the present embodiment; as shown in FIG. 1, etc., in the state where the first and second drive gears 136(1), 136(2) are non-rotatable relative to the drive shaft 125 about an axial line, the first clutch mechanism 180(1), in the transmission direction, is placed between the first driven gear 137(1) and the standard speed power input unit (the first internal gear 26 in the present embodiment) of the first planetary gear mechanism 20, and the second clutch mechanism 180(2), in the transmission direction, is placed between the second driven gear 137(2) and the standard speed power input unit (the second carrier 38 in the present embodiment) of the second planetary gear mechanism 30.

Thus, in the planetary gear assembly 1A, engaging one clutch mechanism (e.g., the first clutch mechanism 180(1)) does not transmit the rotation of the connection member 80 to the driven gear (the second driven gear 137(2) in the present example) on the non-engaged side, making it possible to make the design around the drive shaft 125 advantageous.

Second Embodiment

Another embodiment of the planetary gear assembly according to the present invention will be described below with reference to the accompanying drawings.

Figure 9:
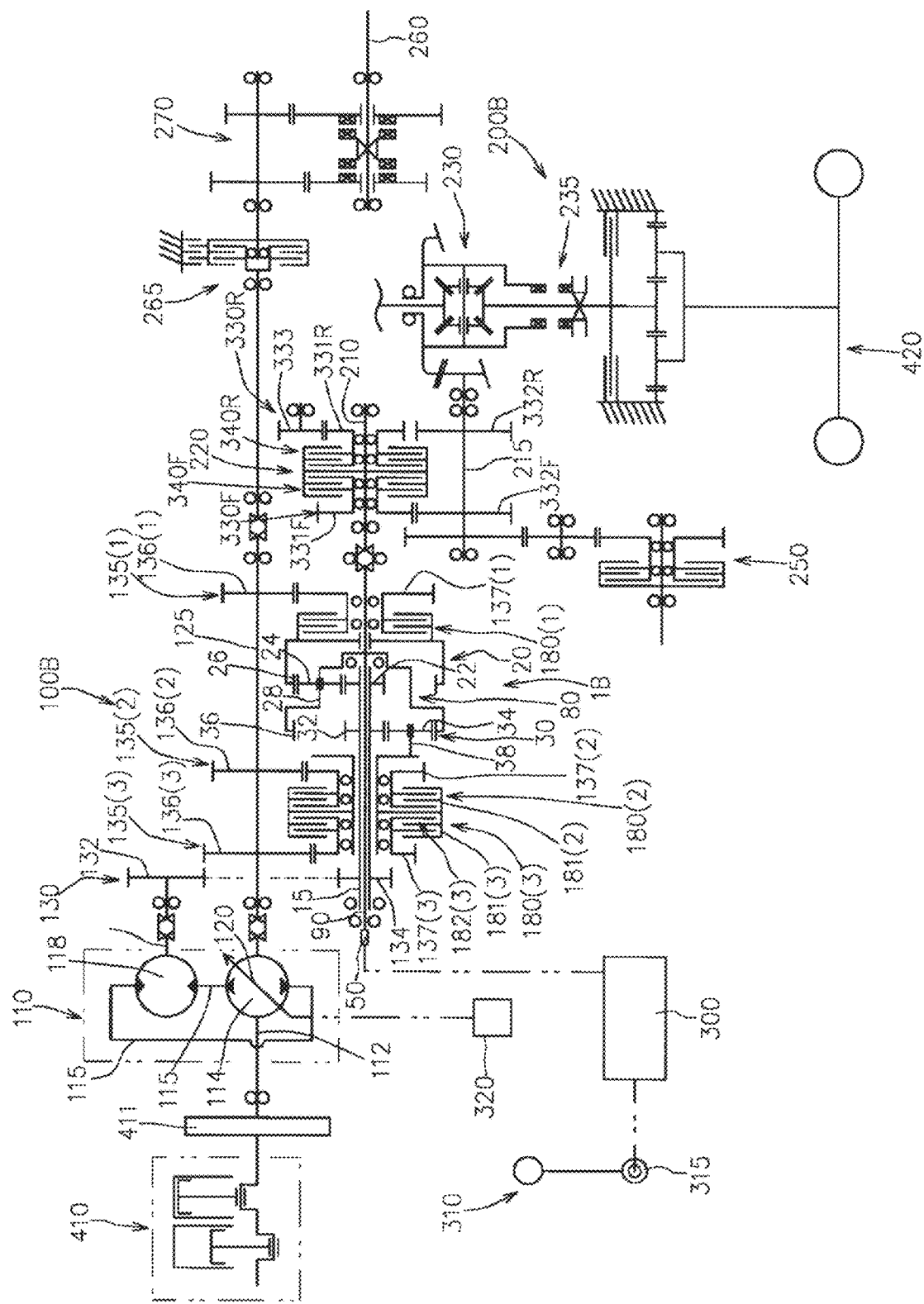
FIG. 9 is a schematic diagram of transmission of a transmission structure of the work vehicle to which a planetary gear assembly according to the second embodiment is applied.

FIG. 9 shows a schematic diagram of transmission of a transmission structure 200B of the work vehicle to which a planetary gear assembly 1B according to the present embodiment is applied.

In FIG. 9, members same as those in the first embodiment are marked with the same reference signs, and the description thereof will be properly omitted.

As shown in FIG. 9, the planetary gear assembly 1B according to the present embodiment, compared to the planetary gear assembly 1 according to the first embodiment, further has a third driven gear 137(3) and a third clutch mechanism 180(3).

The third driven gear 137(3), in a state that the standard rotary speed power is input, is directly or indirectly supported to the transmission shaft 15 with a free relative rotation about an axial line.

The third driven gear 137(3) cooperates with a third drive gear 136(3) supported to the drive shaft 125 without a relative rotation about an axial line, thereby to form a third transmission gear train 135(3).

The third transmission gear train 135(3) constitutes a power transmission path from the drive shaft 125 to the standard rotary speed power input unit (the second carrier 38 in the present embodiment) of the second planetary gear mechanism 30.

As shown in FIG. 9, the third driven gear 137(3) is smaller in pitch diameter than the second driven gear 137(2), and the third transmission gear train 135(3) is higher in speed change ratio than the second transmission gear train 135(2). That is, the third transmission gear train 135(3) rotates the standard rotary speed power input unit (the second carrier 38 in the present embodiment) of the second planetary gear mechanism 30 at a speed higher than the second transmission gear train 135(2).

The third clutch mechanism 180(3) is so supported to the transmission shaft 15 as to be capable of engaging and disengaging the power transmission from the third driven gear 137(3) to the standard rotary speed power input unit (the second carrier 38 in the present embodiment) of the second planetary gear mechanism 30.

As shown in FIG. 9, in the present embodiment, the third clutch mechanism 180(3) is also a hydraulic multi-disc clutch.

In detail, as shown in FIG. 9; the third clutch mechanism 180(3) has a third clutch housing 181(3) supported to the transmission shaft 15 with a free relative rotation about an axial line, a third friction plate group 182(3) that includes a third drive-side friction plate supported to the third driven gear 137(3) without a relative rotation, and a third driven-side friction plate, while being opposed to the third drive-side friction plate, supported to the third clutch housing 181(3) without a relative rotation, and a third piston (not shown) that frictionally engages the third friction plate group 182(3).

The third clutch housing 181(3) is connected to the second carrier 38, which forms the standard rotary speed power input unit, without a relative rotation about an axial line.

In the present embodiment, the third clutch housing 181(3) is formed integrally with the second clutch housing 181(2).

The third clutch mechanism 180(3) is so configured as to engage and disengage the power transmission by a third clutch actuated member (not shown) that is operatively controlled by the control unit 300.

Figure 10:
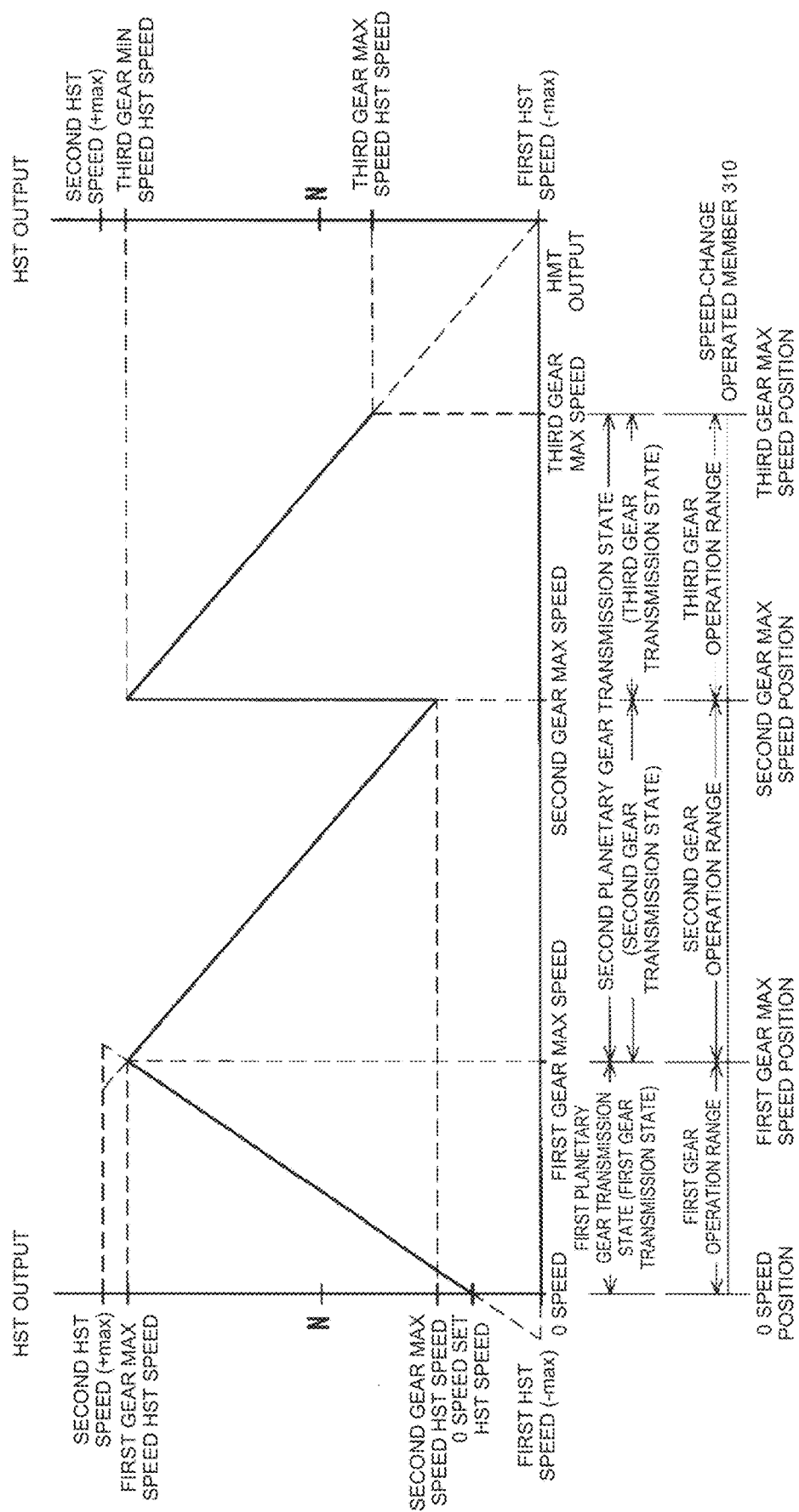
FIG. 10 is a graph showing the relation between the HST output and the HMT output in the HMT device including the planetary gear assembly according to the second embodiment.

FIG. 10 is a graph showing the relation between the HST output and the HMT output in an HMT device 100B provided with the planetary gear assembly 1B.

As shown in FIG. 10, in the HMT device 100B, the second planetary gear transmission state includes the second gear transmission state and a third gear transmission state.

The second gear transmission state is a transmission state generated when the first clutch mechanism 180(1) is shut off, the second clutch mechanism 180(2) is engaged, and the third clutch mechanism 180(3) is shut off.

The third gear transmission state is the transmission state generated when the first clutch mechanism 180(1) is shut off, the second clutch mechanism 180(2) is shut off, and the third clutch mechanism 180(3) is engaged.

In this case, as shown in FIG. 10, the shift range of the speed-change operated member 310 includes the first gear shift range from the 0 speed position to the first gear maximum speed position, the second gear shift range from the first gear maximum speed position to the second gear maximum speed position, and the third gear shift range from the second gear maximum speed position to the third gear maximum speed position.

When the speed-change operated member 310 is operated in the range from the 0 speed position to the second gear maximum speed position; for the HST actuated member 320 and the first and second clutch actuated members 145(1), 145(2), the control unit 300 performs the actuating control same as in the first embodiment.

Meanwhile, when the speed-change operated member 310 is positioned in the second gear maximum speed position, the control unit 300 so operates the first to third clutch actuated members 145(1) to 145(3) as to engage one of the second clutch mechanism 180(2) and the third clutch mechanism 180(3) and to shut off the remaining clutch mechanism, and when the speed-change operated member 310 is positioned in the third gear shift range, the control unit 300 so operates the first to third clutch actuated members 145(1) to 145(3) as to shut off the first and second clutch mechanisms 180(1), 180(2) and as to engage the third clutch mechanism 180(3) thereby to produce the third gear transmission state.

In the present embodiment, the control unit 300, for the transition between the second gear transmission state and the third gear transmission state, executes the following actuating control so as to prevent a sudden speed change in the HMT output.

That is, the control unit 300, when the speed-change operated member 310 is operated to increase the speed to the second gear maximum speed position in the second gear shift range, actuates the HST actuated member 320 so that the HST output becomes a second gear maximum speed HST speed, causing the HMT output to be the second gear maximum speed.

Here, in the third gear transmission state, the standard rotary speed power is input via the third transmission gear train 135(3), which is higher in speed change ratio than the second transmission gear train 135(2), to the second element (the second carrier 38 in the shown mode) of the second planetary gear mechanism 30.

Thus, causing the transition from the second gear transmission state to the third gear transmission state while keeping the HST output at the second gear maximum speed HST speed causes a large speed change to the HMT output.

In view of this, in the present embodiment; when the speed-change operated member 310 is operated from the second gear shift range to the third gear shift range, the control unit 300 actuates the second and third clutch actuated members 145(2) and 145(3) so that the second clutch mechanism 180(2) is in the shutoff state and the third clutch mechanism 180(3) is in the engaged state thereby to cause the transition from the second gear transmission state to the third gear transmission state, meanwhile, actuates the HST actuated member 320 so that the HST output changes from the second gear maximum speed HST speed to a third gear minimum speed HST speed, thereby to prevent or reduce the speed change in the HMT output during the transition between the second gear transmission state and the third gear transmission state.

The third gear minimum speed HST speed, under the third gear transmission state, is set to the speed that causes the HMT output to be the second gear maximum speed.

Then, the control unit 300 actuates the HST actuated member 320, as follows.

(1) When determining, based on the signal from the shift position sensor 315, that the speed-change operated member 310 is operated to increase the speed within the third gear shift range, change the HST output from the second HST speed's side to the first HST speed's side.

(2) When determining, based on the signal from the shift position sensor 315, that the speed-change operated member 310 is shifted to the third gear maximum speed position, set the HST output to the third gear maximum speed HST speed.

Further, the third gear maximum speed HST speed is properly set according to the vehicle speed specification of the work vehicle. In the present embodiment, as shown in FIG. 10, the third gear maximum speed HST speed is the speed that is changed from the first HST speed, which is one end of the variable range of the HST output, to the second HST speed's side more than the second gear maximum speed HST speed.

Third Embodiment

In the present embodiment, the planetary gear assembly 1A according to the first embodiment is applied to another transmission structure 200C which is different from the transmission structure 200A.

Figure 11:
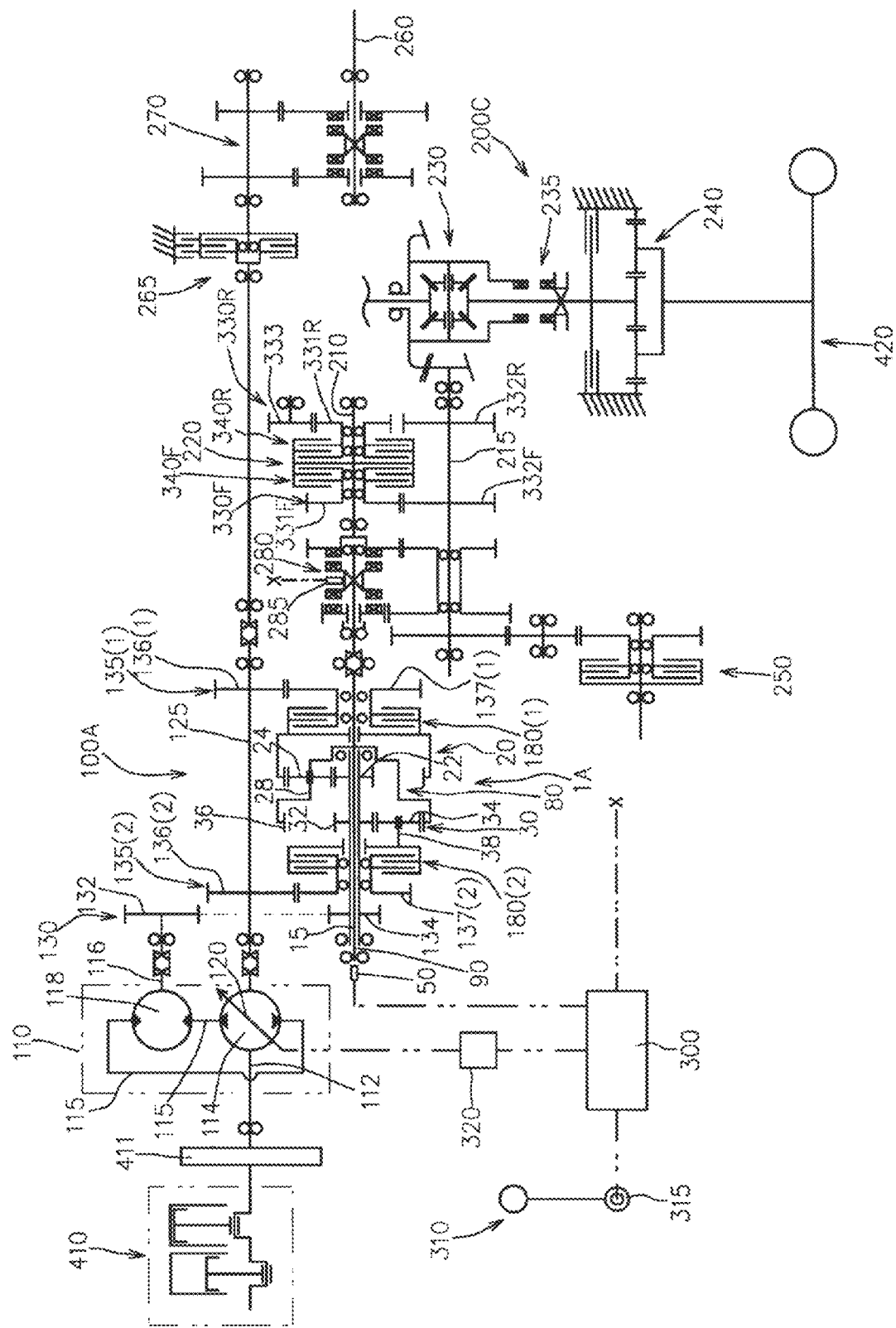
FIG. 11 is a schematic diagram of transmission of another transmission structure to which the planetary gear assembly according to the first embodiment is applied.

FIG. 11 shows a schematic diagram of transmission of the transmission structure 200C.

In FIG. 11, members same as those of the first and second embodiments are marked with the same reference signs, and the description thereof will be properly omitted.

As shown in FIG. 11, the transmission structure 200C, compared to the transmission structure 200A in the first embodiment, is provided with an auxiliary transmission 280 that can change the output of the HMT device 100A in multiple gears.

In the present embodiment, the auxiliary transmission 280, in the power transmission direction, is placed between the HMT device 100A and the forward and rearward switch mechanism 220, making it possible to change the speed in two steps including a low gear L and a high gear H.

The auxiliary transmission 280 is so configured as to switch between the low gear L and the high gear H, for example, via a mechanical link mechanism in response to a human operation to an auxiliary speed-change operated member (not shown) including a lever or an electric switch, or via an auxiliary speed-change actuated member such as a hydraulic or electric actuator operatively controlled by the control unit 300.

Figure 12:
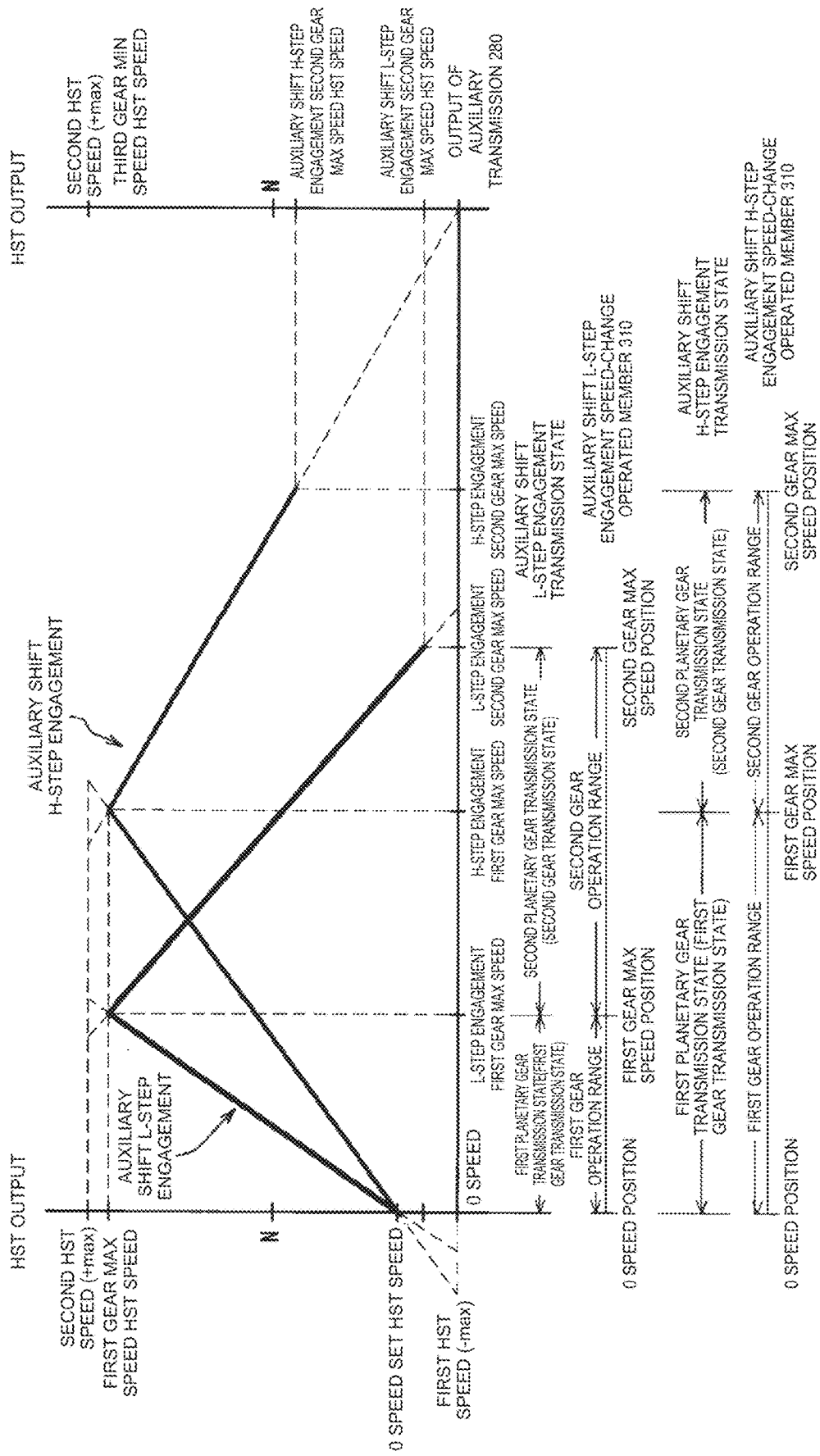
FIG. 12 is a graph showing the relation between the HST output and an auxiliary transmission's output in the transmission structure shown in FIG. 11.

FIG. 12 is a graph showing the relation between the HST output and the auxiliary transmission 280's output.

The transmission structure 200C is provided with an auxiliary speed-change sensor 285 (see FIG. 11) that can detect the transmission state of the auxiliary transmission 280 and send a detection signal to the control unit 300. The auxiliary speed-change sensor 285 can take various modes, such as a sensor for detecting the shift position of the auxiliary speed-change operated member, a sensor for detecting the actuated state of the auxiliary transmission 280, or a sensor for detecting the movement of the auxiliary speed-change actuated member.

In the present embodiment, as shown in FIG. 12, the control unit 300 is so configured as to set, in an auxiliary shift L-step engagement state, the HST output to an auxiliary shift L-step engagement second gear maximum speed HST speed in response to the speed-change operated member 310 shifted to the second gear maximum speed position, meanwhile, as to set, in an auxiliary shift H-step engagement state, the HST output to an auxiliary shift H-step engagement second gear maximum speed HST speed, which is lower by a given speed than the auxiliary shift L-step engagement second gear maximum speed HST speed in response to the speed-change operated member 310 shifted to the second gear maximum speed position.

The auxiliary shift L-step engagement second gear maximum speed HST speed and the auxiliary shift H-step engagement second gear maximum speed HST speed are properly set according to the specification of the work vehicle.

Fourth Embodiment

Then, a still other embodiment of the planetary gear assembly according to the present invention will be described below with reference to the accompanying drawings.

Figure 13:
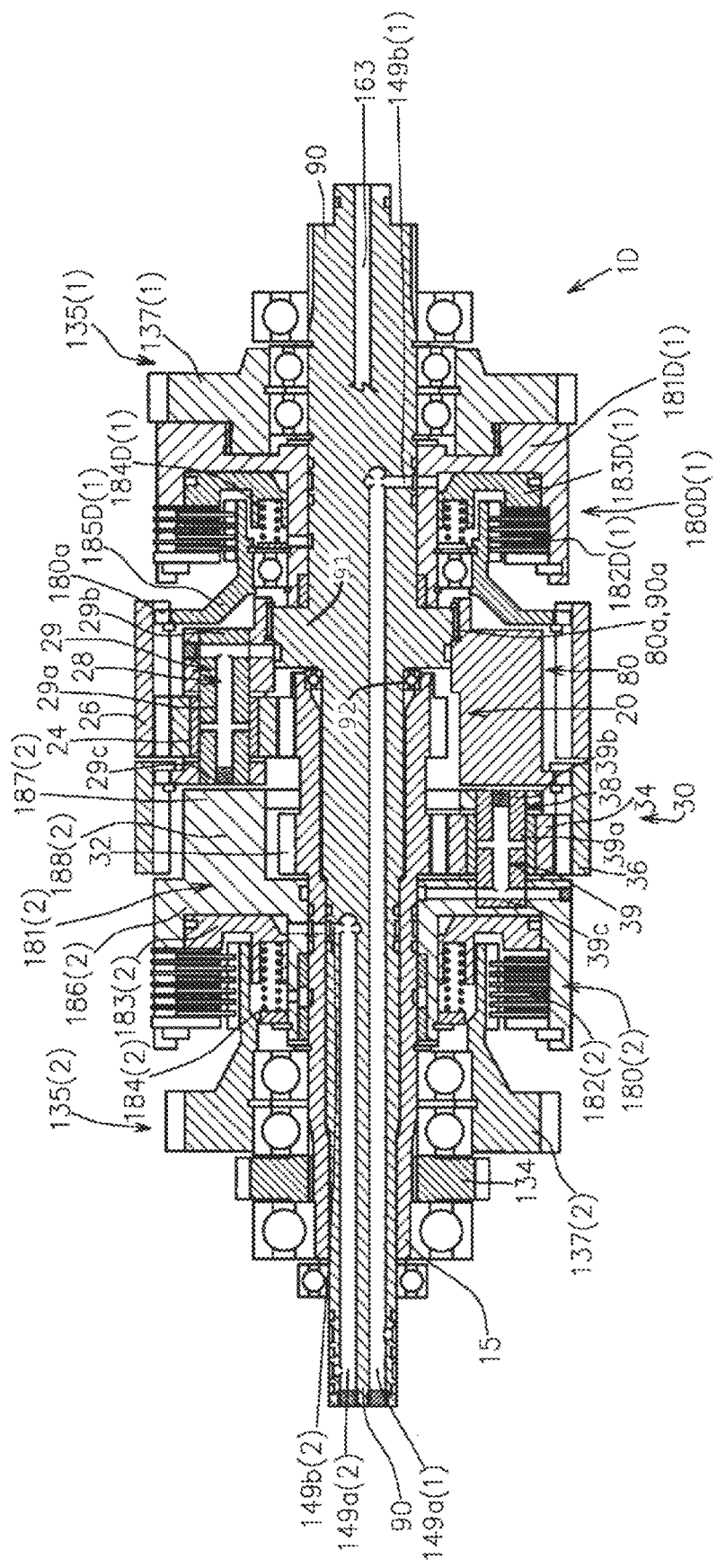
FIG. 13 is a longitudinal cross-sectional view of a planetary gear assembly according to a fourth embodiment.

FIG. 13 is a longitudinal cross-sectional view of a planetary gear assembly 1D according to the present embodiment.

Figure 14:
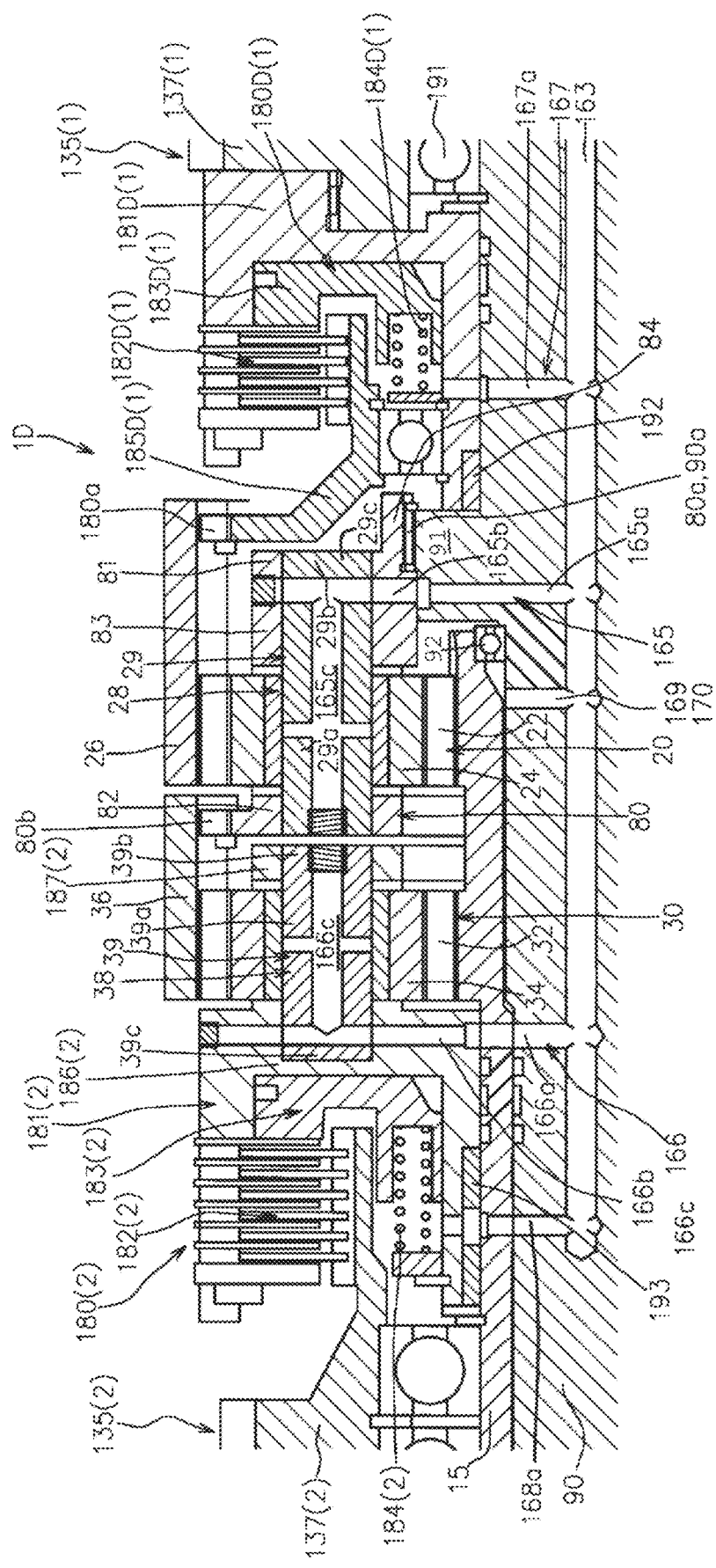
FIG. 14 is a partially enlarged longitudinal cross-sectional view of the planetary gear assembly according to the fourth embodiment.

Further, FIG. 14 is a partially enlarged longitudinal cross-sectional view of the planetary gear assembly 1D.

In FIG. 13 and FIG. 14, members same as those in each of the above embodiments are marked with the same reference signs, and the description thereof will be properly omitted.

The planetary gear assembly 1D according to the present embodiment differs from the planetary gear assembly 1A according to the first embodiment only in that the first clutch mechanism 180(1) is changed to a modified first clutch mechanism 180D(1).

As shown in FIG. 13 and FIG. 14, the modified first clutch mechanism 180D(1) has a first clutch housing 181D(1) directly or indirectly supported to the radial enlarged portion 91 with a free relative rotation about an axial line, a first friction plate group 182D(1) including a first drive-side friction plate supported to the first clutch housing 181D(1) without a relative rotation and with an axial movement, and a first driven-side friction plate placed opposite the first drive-side friction plate, a first rotary member 185D(1) that, while being extrapolated to the first clutch housing 181D(1) with a free relative rotation about the axal line, supports the first driven-side friction plate without a relative rotation and with an axial movement, and a first piston 183D(1) that frictionally engages the first friction plate group 182D(1) by a pressure oil supplied to an oil chamber in the first clutch housing 181D(1).

The code 184D(1) in FIG. 14 is a return spring that biases the first piston 183D(1) away from the first friction plate group 182D(1); for frictionally engaging the first friction plate group 182D(1), the first piston 183D(1), by the force of the pressure oil, is pushed toward the first friction plate group 182D(1) against the biasing force of the return spring 18.

The first clutch housing 181D(1) is connected to the first driven gear 137(1) without a relative rotation about an axial line.

Further, in the present embodiment, as shown in FIG. 14, a ball bearing is interposed between the output shaft 90 and the first driven gear 137(1) so as to facilitate smooth rotation of the first driven gear 137(1) relative to the output shaft 90; further, a needle bearing is interposed between the output shaft 90 and the first clutch housing 181D(1) so as to facilitate smooth rotation of the first clutch housing 181D(1) relative to the output shaft 90. Further, in the present embodiment, as shown in FIG. 14, two rows of needle bearings are interposed between the second clutch housing 181(2) and the transmission shaft 15, thereby increasing the smoothness of the rotation of the second clutch housing 181(2) relative to the transmission shaft 15.

The first rotary member 185D(1) is provided with the outer tooth portion 180a for meshing with the first internal gear 26, and is connected via the outer tooth portion 180a to the first internal gear 26 without a relative rotation about an axial line.

Compared to the planetary gear assembly 1A according to the first embodiment; the planetary gear assembly 1D provided with the modified first clutch mechanism 180D(1), in the second planetary gear transmission state (second gear transmission state), making it possible to effectively prevent or reduce energy loss in the double transmission state, abnormal wear and seizure of the first friction plate group 182D(1), and temperature rise of hydraulic oil due to absorption of friction heat of the first friction plate group 182D(1).

That is, as shown in FIG. 4, etc., and described above; in the first clutch mechanism 180(1) in the first embodiment, the first drive-side friction plate is supported to the first driven gear 137(1) without a relative rotation and with an axial movement, and the first driven-side friction plate, while being opposed to the first drive-side friction plate, is supported to the first clutch housing 181(1) without a relative rotation and with an axial movement; the first clutch housing 181(1) is connected to the first internal gear 26, which forms the standard rotary speed power input unit, without a relative rotation about an axial line.

In the planetary gear assembly 1A provided with the first clutch mechanism 180(1) having the above configuration, the following phenomena may be caused in the second planetary gear transmission state (second gear transmission state) which is generated when the first clutch mechanism 180(1) is in the shutoff state and the second clutch mechanism 180(2) is in the engaged state.

That is, in the second planetary gear transmission state (second gear transmission state), the second internal gear 36, which acts as the composite output unit, is rotated by the composite rotary power of the reference rotary power operatively transmitted to the second carrier 38 via the second driven gear 137(2) and the second clutch mechanism 180(2), and the HST output that is operatively transmitted via the driven gear 134 and the transmission shaft 15 to the second sun gear 32.

The second internal gear 36's rotation by the composite rotary power is transmitted via the connection member 80 to the output shaft 90, wherein the rotation of the connection member 80 is also transmitted via the first carrier 28 and the first planetary gear 24 to the first internal gear 26, and the first clutch housing 181(1) is driven and rotated via the first internal gear 26.

Here, the connection member 80 rotates at a higher speed in the second planetary gear transmission state (second gear transmission state) than in the first planetary gear transmission state (first gear transmission state); thus, the first clutch housing 181(1)'s driven rotation in the second planetary gear transmission state (second gear transmission state) is relatively high, and a centrifugal force acts on the oil in the oil chamber of the first clutch housing 181(1), causing a phenomenon that the first piston 183(1) is unintentionally pushed toward the first friction plate group.

The above phenomenon leads to inconveniences such as energy loss, abnormal wear of the friction plate group 182(1), and temperature rise of the hydraulic oil.

In contrast, in the modified first clutch mechanism 180D (1), the first rotary member 185D(1), not the first clutch housing 181D(1), is connected to the first internal gear 26.

Thus, in the second planetary gear transmission state (second gear transmission state), the first clutch housing 181D(1) is not driven and rotated at a high speed via the first internal gear 26, making it possible to effectively prevent or reduce the inconvenience.

The same phenomenon may be caused to the second clutch mechanism 180(2) in the first planetary gear transmission state (second gear transmission state), but the connection member 80's rotary speed in the first planetary gear transmission state (first gear transmission state) is lower than in the second planetary gear transmission state (second gear transmission state).

Thus, it is unlikely that the inconvenience is caused to the second clutch mechanism 180(2) in the first planetary gear transmission state (second gear transmission state); however, it is also possible to replace the second clutch mechanism 180(2) with a modified second clutch mechanism (not shown) provided with a configuration similar to that of the modified first clutch mechanism 180D(1).

That is, the modified second clutch mechanism includes a second clutch housing directly or indirectly supported to the transmission shaft 15 with a free relative rotation about an axial line, a second friction plate group including a second drive-side friction plate supported to the second clutch housing without a relative rotation and with an axial movement, and a second driven-side friction plate placed opposing the second drive-side friction plate, a second rotary member that, while being extrapolated to the transmission shaft 15 with a free relative rotation about an axial line, supports the second driven-side friction plate without a relative rotation and with an axial movement, and a second piston that frictionally engages the second friction plate group by a pressure oil supplied to an oil chamber in the second clutch housing, wherein the second clutch housing is connected to the second driven gear 135(2) with a free relative rotation about an axial line, and the second rotary member is connected to the second carrier 38 without a relative rotation about an axial line of the second sun gear 32.

Further, the modified second clutch mechanism is also provided with a return spring that biases the second piston away from the second friction plate group.

Fifth Embodiment

Then, a still other embodiment of the planetary gear assembly according to the present invention will be described below with reference to the accompanying drawings.

Figure 15:
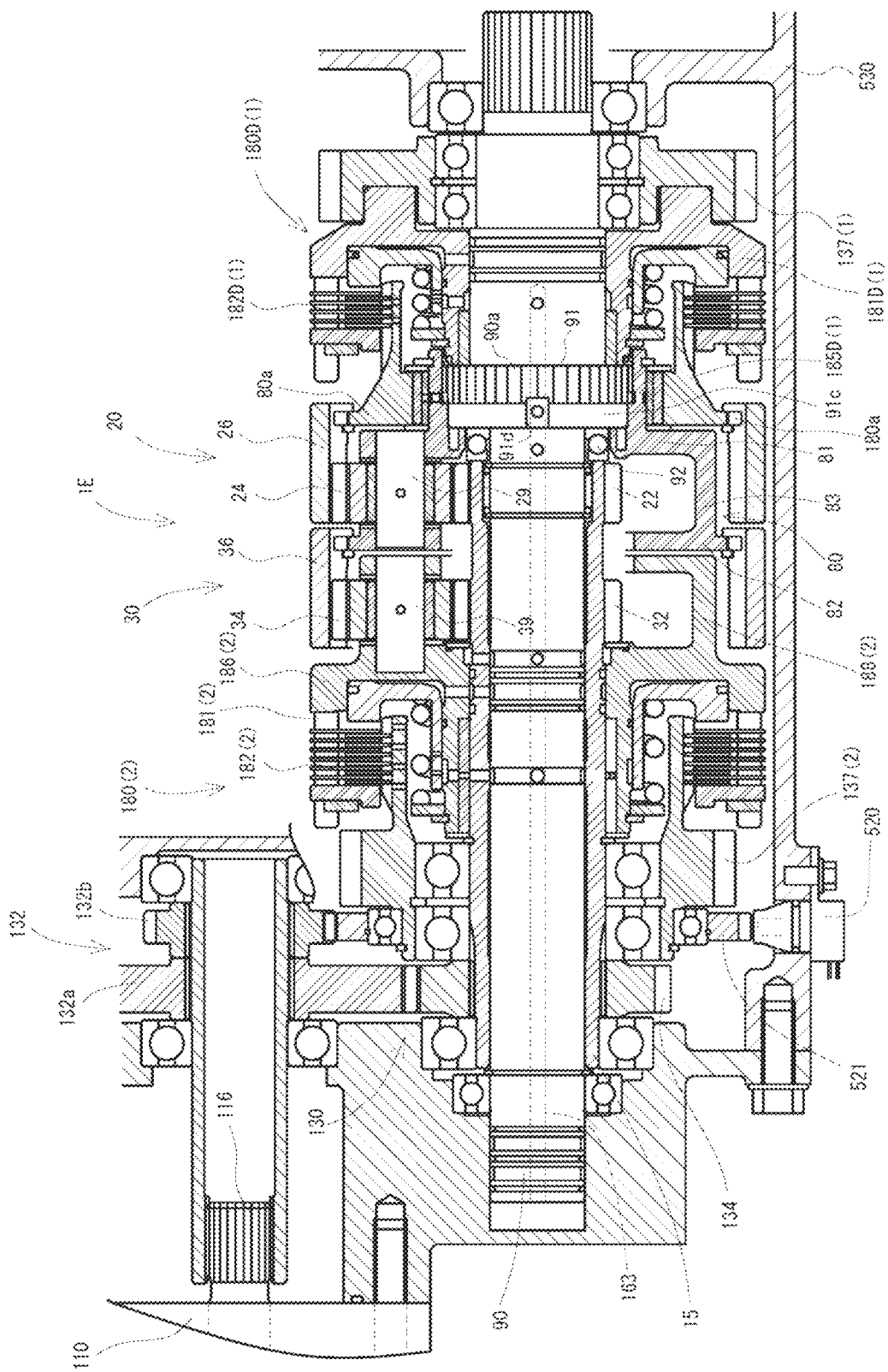
FIG. 15 is a longitudinal cross-sectional view of a planetary gear assembly according to a fifth embodiment.

FIG. 15 is a longitudinal cross-sectional view of a planetary gear assembly 1E according to a fifth embodiment.

Figure 16:
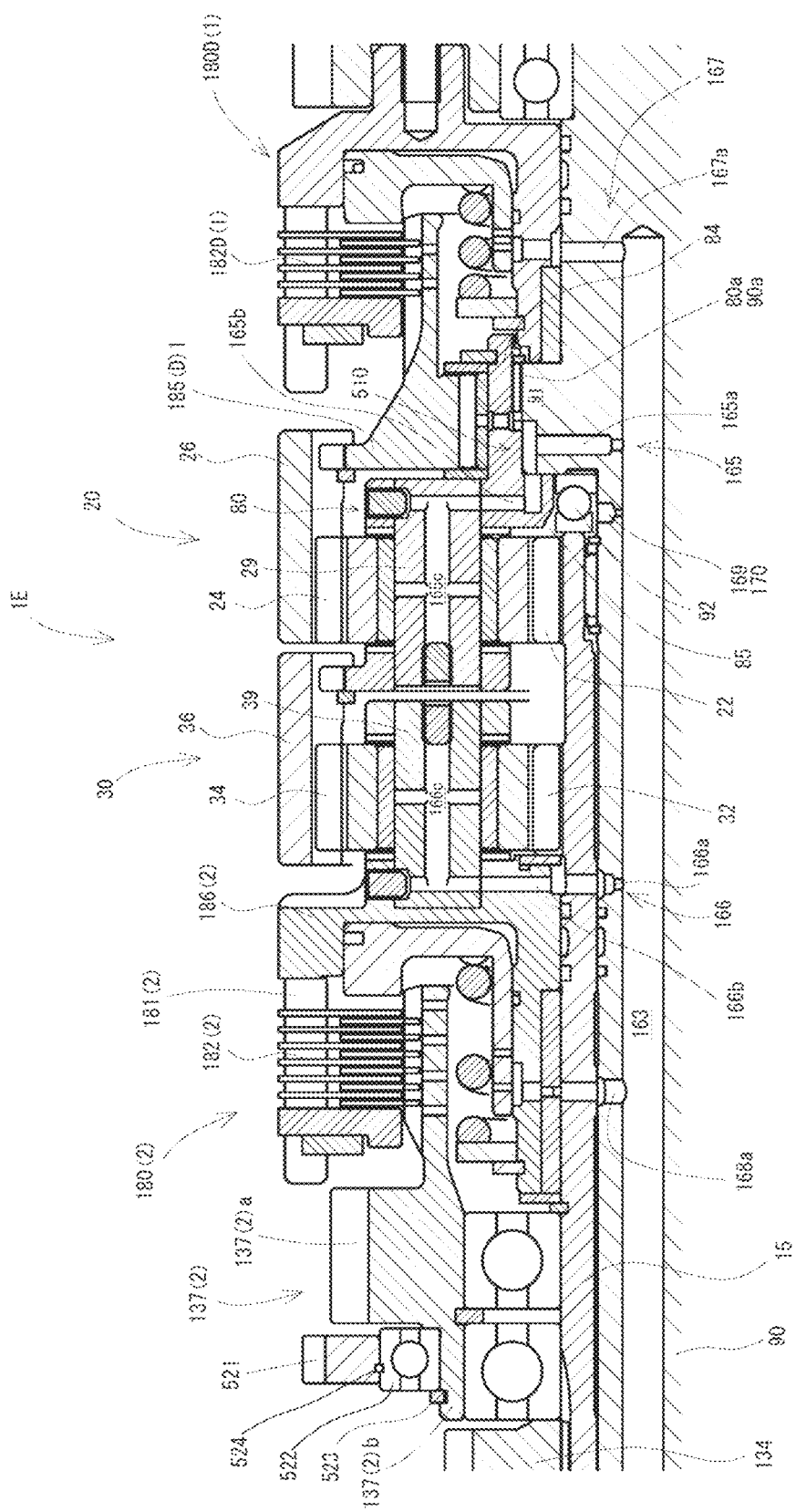
FIG. 16 is a partially enlarged longitudinal cross-sectional view of the planetary gear assembly according to the fifth embodiment.

FIG. 16 is a partially enlarged longitudinal cross-sectional view of the planetary gear assembly 1E.

Figure 17:
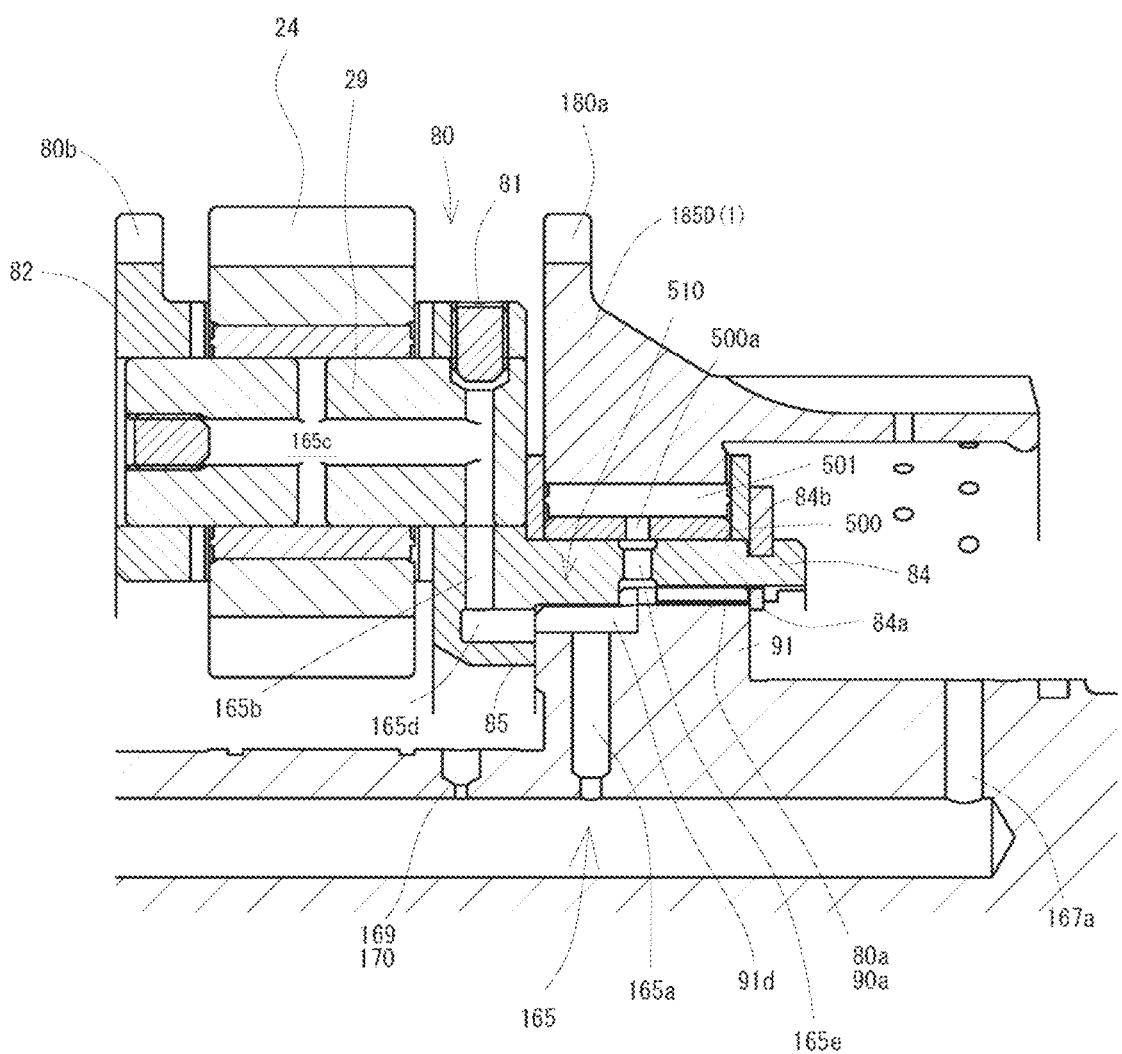
FIG. 17 is a partial cross-sectional perspective view of a connection member in the planetary gear assembly according to the fifth embodiment above.

FIG. 17 is an enlarged longitudinal cross-sectional view of the structure around the connection member 80.

Figure 18:
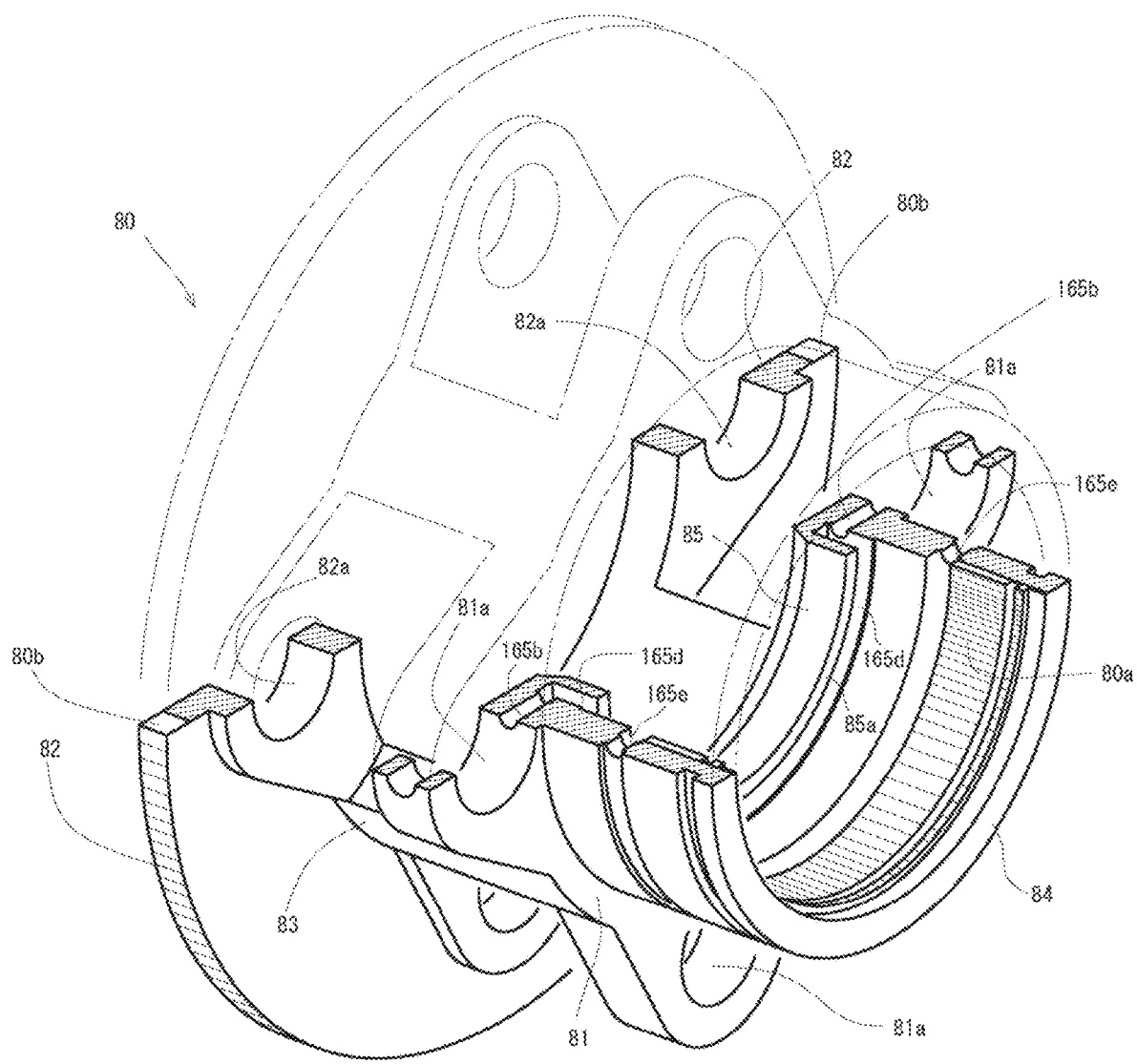
FIG. 18 is a partial cross-sectional perspective view of an essential part of the output shaft in the planetary gear assembly according to the fifth embodiment above.

FIG. 18 is a partial cross-sectional perspective view of the connection member 80.

Figure 19:
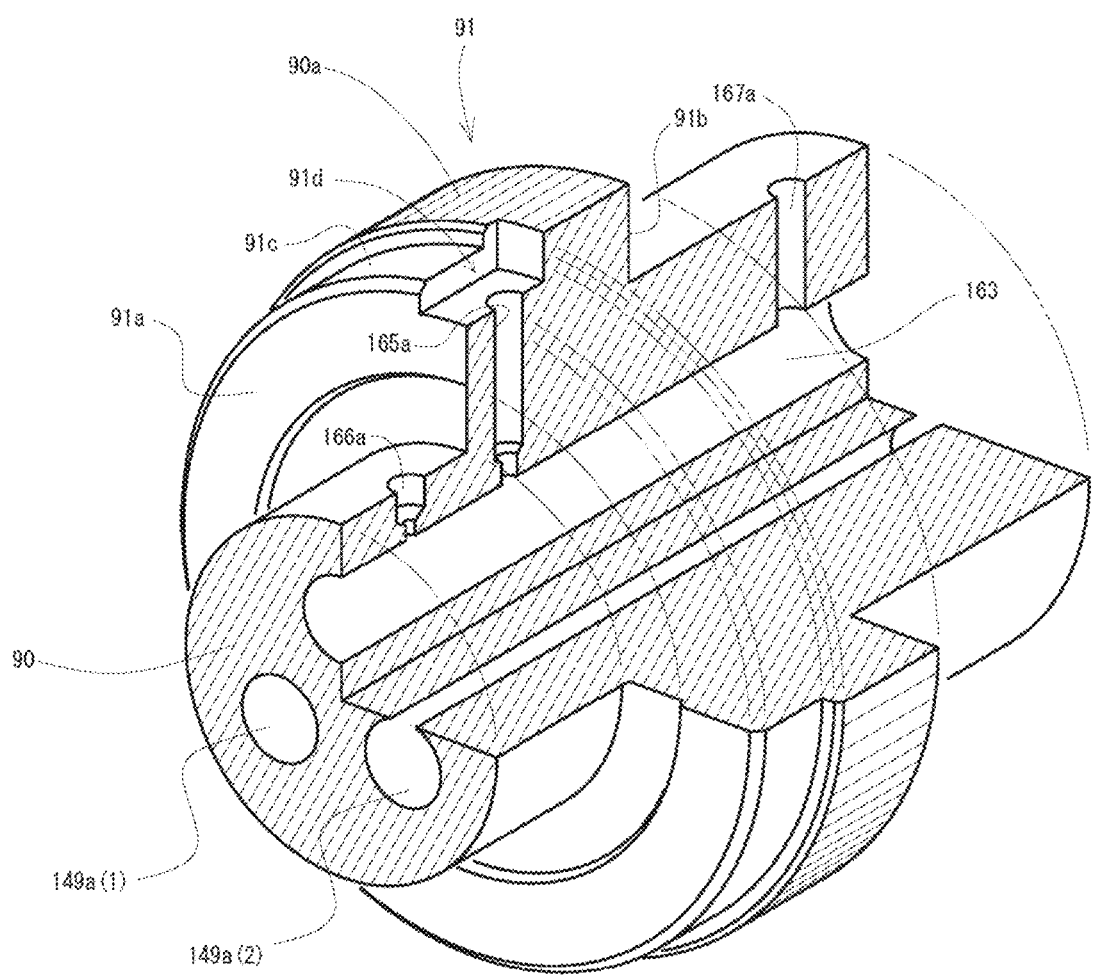
FIG. 19 is a partial cross-sectional perspective view of the essential part of the output shaft 90.

FIG. 19 is a partial cross-sectional perspective view of the essential part of the output shaft 90.

In the figures, members same as those in the first to fourth embodiments are marked with the same reference signs, and the description thereof will be properly omitted.

The entirety of the planetary gear assembly 1E according to the fifth embodiment is shown in FIG. 15, and is based on the combination of the modified first clutch mechanism 180D(1) and the second clutch mechanism 180(2), as the planetary gear assembly 1D of the fourth embodiment described above.

Then, in the following manner, an improvement for shortening the overall length of the transmission is made for the modified first clutch mechanism 180D(1), and an improvement for providing an HST output detection rotary sensor 520 with a dedicated detected gear 521 without affecting the length of the transmission is made for the second clutch mechanism 180(2).

First, concerning the modified first clutch mechanism 180D(1); the first rotary member 185D(1)'s bearing support structure and lubricant supply structure 510, which are made so as to shorten the overall length of the transmission, are to be described.

As shown in FIG. 19, the radial enlarged portion 91 integrally formed in the middle portion along the axial direction of the output shaft 90 has one end face 91a facing one side (left side on the paper sheet) in the axial length direction, another end face 91b facing the other side (right side on the paper sheet), and an outer peripheral face 91c spanning both the one end face 91a and the other end face 91b. On the outer peripheral face 91c, an engaging portion 90a that engages with the engaging portion 80a of the connection member 80 is formed convexly from the middle portion position in the axial length direction to the other end face 91b.

As shown in FIG. 17 and FIG. 18, on the inner peripheral side of the body portion 81, there is provided an extended portion 85 which can contact the outer peripheral edge of the one end face 91a of the radial enlarged portion 91. Meanwhile, the support boss portion 84 has its axial longitudinal dimension longer than that of the radial enlarged portion 91.

When the support boss portion 84 is assembled to the radial enlarged portion 91 until the extended portion 85 contacts the one end face 91a, the inner peripheral face of the support boss portion 84 of the connection member 80 mates with the outer peripheral face 91c of the radial enlarged portion 91, the engaging portion 90a engages with the engaging portion 80a, and the other end portion of the extended portion 85 protrudes outward from the other end face 91b.

So fitting a retainer ring 84a to the inner peripheral face portion of the support boss portion 84, which protrudes out from the other end face 91b, as to contact the other end face 91b fixes the connection member 80 to the output shaft 90 without an axial movement and without a relative rotation.

A bearing bush 500 is placed on the outer peripheral face of the support boss portion 84, and a needle bearing 501 is stacked on the bearing bush 500. Then, to on the needle bearing 501, the first rotary member 185D(1) of the modified first clutch mechanism 180D(1) is supported with a free relative rotation. In this state, the one end face of the first rotary member 185D(1) is caused to contact, via a washer, the other end face of the body portion 81 of the connection member 80. So fitting a retainer ring 84b to the outer peripheral face portion of the support boss portion 84, which protrudes out from the other end face 91b, as to contact the other end face of the first rotary member 185D(1) fixes the first rotary member 185D(1) to the connection member 80 without an axial movement and with a free relative rotation.

When the connection member 80 including the support boss portion 84 is treated to a high hardness, such as by quenching, the needle bearing 501, by abolishing the bearing bush 500, can be placed directly on the outer peripheral face of the support boss portion 84.

In the fourth embodiment above, the first rotary member 185D(1) of the modified first clutch mechanism 180D(1) is supported to a bearing adjacent to the radial enlarged portion 91. The presence of this bearing is a factor that enlarges the planetary gear assembly 1D in the axial direction.

In comparison, the fifth embodiment provides a bearing support for the first rotary member 185D(1) in a manner to be stacked above the point for connecting the connection member 80 to the output shaft 90, thus making it possible to shorten the axial dimension of the planetary gear assembly 1E.

The durability of the needle bearing 501 is improved by forced lubrication toward a lubricated site such as an inner roller. The present embodiment provides the following lubricant supply structure 510 using the first planetary gear lubricant guide path 165 (first planetary gear lubricant takeout path 165a) as the oil source.

As shown in FIG. 19, at least one depression 91d, notched by machining, is provided in a boundary portion between the one end face 91a and the outer peripheral face 90c in the radial enlarged portion 91. The end of the depression 91d in the axial direction is set to the extent that the tip portion of the engaging portion 90a is cut off. This allows the oil introduced into the depression 91d to flow to the engaging portions 80a and 90a thereby to lubricate their meshing portions, as described below.

In the middle portion in the axial direction at the support boss portion 84 of the connection member 80, there is formed a plurality of radial oil paths 165e through the inside and outside and along the radial direction. Further, on the inner and outer peripheral faces of the support boss portion 84, inner and outer annular grooves are concentrically formed so that the inner and outer opening ends of the oil path 165e face respectively. This inner annular groove overlaps radially with the depression 91d when the connection member 80 is assembled to the output shaft 90.

Further, in positions facing the outer peripheral annular groove of the support boss portion 84, the bearing bush 500 is provided with a plurality of in/out through radial oil paths 500a in the circumferential direction. The outer peripheral opening end of the radial oil path 500a faces the inner portion of the needle bearing 501.

Inside the radial enlarged portion 91, the first planetary gear lubricant takeout path 165a is present, as in the fourth embodiment. In the fifth embodiment, the end of the first planetary gear lubricant takeout path 165a is open at the bottom of the depression 91d.

The lubricant flowing in the first planetary gear lubricant takeout path 165a is once collected in the depression 91d, passes through a gap between the engaging portions 80a and 90a, passes from the inner annular groove of the support boss portion 84 through the radial oil path 165e and the annular groove 81c, and then, via the outer peripheral annular groove, is released from the radial oil path 500a of the bearing bush 500 toward the needle bearing 501, and forcibly lubricates the lubricated site.

In the fifth embodiment, the oil collected in the depression 91d is divided and led also to the first pin oil path 165c of the first planetary gear 24. The specific structure thereof is described below.

As shown in FIG. 18, the extended portion 85, which serves as a positioning when fixing the connection member 80 to the output shaft 90, has another side face 85a that can adhere to the one end face 91a of the radial enlarged portion 91. The other side face 85a is provided with an oil groove 165d which is formed by depressing, along the axial direction, the position facing the depression 91d.

Meanwhile, as also shown in FIG. 17, the first oil path 165b inside the body portion 81 extends toward the rotary center side, and communicates its end with the upper face of the oil groove 165d inside the extended portion 85. As a result, flowing the lubricant in the first planetary gear lubricant takeout path 165a in the output shaft 90 can simultaneously supply the lubricant to the bearing point of the first planetary gear 24 and the bearing point of the first rotary member 185E(1) of the modified first clutch mechanism 180E(1).

The fifth embodiment is provided with the HST output detection rotary sensor 520 in the transmission case 530 that cases the planetary gear assembly 1E, as shown in FIG. 15. The structure in which the dedicated detected gear 521 for the rotary sensor 520 is provided on the modified second clutch mechanism 180E(2) side without lengthening the transmission is described. In the figure, members same as those in the first to fourth embodiments are marked with the same reference signs, and the description thereof will be properly omitted.

For increasing a detection accuracy, it is preferable to mount the rotary sensor 520 on the transmission case 530 as close as possible to a rotating detected object.

The drive gear 132 fixed to the motor shaft 116 of the HST 110 is positioned on the center side of the transmission case 530 in the right/left width direction. For this reason, it is difficult to bring the rotary sensor 520 close to the drive gear 132; thus the drive gear 132 is not suitable as the detected object.

Further, the driven gear 134, which meshes with the drive gear 132, has an increased gear ratio setting, and thus is smaller in outer diameter than any other component coaxially positioned. Thus, the driven gear 134 is also away from the transmission case 530, making it difficult to bring the rotary sensor 520 close to the driven gear 134; thus, the driven gear 134 is not suitable as the detected object.

Thus, the detected object in the fifth embodiment, as a dedicated detected gear-shaped component that is not involved in the power transmission, has an outer diameter thereof set to a dimension having a priority of increasing the detection accuracy of the rotary sensor 520.

The drive gear 132 fixed to the motor shaft 116 includes a first drive gear 132*a* and a second drive gear 131*b*, and the first drive gear 132*a*, as a power transmission drive gear, meshes with the driven gear 134.

The other second drive gear 132*b*, which is not involved in power transmission, meshes with a dedicated detected gear 521 described below.

As in each of the first to fourth embodiments; in the fifth embodiment, the second driven gear 137(2) of the second clutch mechanism 180(2), so as to be stably supported to the transmission shaft 15, has a bearing holding portion wider than a teeth portion 137(2)*a* thereof, and places two bearings side by side on the transmission shaft 15.

As shown in FIG. 16, in the second driven gear 137(2) in the fifth embodiment, the teeth portion 137(2)*a* thereof further has, at a point closer to the second clutch housing 181(2), a tooth width necessary for the power transmission. On the side facing the driven gear 134, a cylindrical boss portion 137(2)*b* having a thickness and width that serve as the bearing holding portion protrudes.

As shown in FIG. 16, the dedicated detected gear 521 is thin in width, and has a bearing 522 held in a rotary center portion thereof. The dedicated detected gear 521 is placed on the cylindrical boss portion 137(2)*b* with a free relative rotation and without an axial movement. No. 523 is a retainer ring 523 for preventing removal of the dedicated detected gear 521.

For the dedicated detected gear 521 to hold the bearing 522, the dedicated detected gear 521 and the bearing 522 must be retained with a free relative rotation but without an axial movement. As a specific example, as shown in FIG. 16, the outer ring of the bearing 522 has a retainer ring groove, a holding hole inner peripheral face of the dedicated detected gear 521 has a retainer ring groove, and a retainer ring 524 is interposed between the bearing 522 and the dedicated detected gear 521. In place of the retainer ring 524, press-fitting the bearing 522 and the dedicated detected gear 521 together thereby to fix the bearing 522 and the dedicated detected gear 521 without an axial movement is allowed.

For downsizing the transmission case 530; the transmission case 530's inner walls opposed to the clutch housings 180D(1), 180(2) and the internal gears 26 and 36 which are placed coaxially with the dedicated detected gear 521 and have larger outer diameters are positioned so that outer wall faces of the above do not contact the inner walls while being as close as possible to each other, as shown in FIG. 15.

The rotary sensor 520 is so mounted on the transmission case 530 as to cause a rotation detecting unit to oppose the dedicated detected gear 521. The dedicated detected gear 521, which rotates in synchronization with the motor shaft 116 of the HST 110 but is not involved in the run power transmission, has few design restrictions in determining its outer diameter dimension. Thus, as shown in the figure, the outer diameter of the dedicated detected gear 521 may be so increased as to bring the rotation detecting unit of the rotary sensor 520 closer to the dedicated detected gear 521. The number of teeth of the dedicated detected gear 521 can also be freely set, and the gear ratio of the dedicated detected gear 521 may be so set as to match the allowable frequency of the rotary sensor 520, thus further improving the detection accuracy.

REFERENCE SIGNS LIST 1A planetary gear assembly
1B planetary gear assembly
1C planetary gear assembly
1D planetary gear assembly
1E Planetary gear assembly
15 transmission shaft
20 first planetary gear mechanism
22 first sun gear (first element)
24 first planetary gear
26 first internal gear (second element)
28 first carrier (third element)
29 first carrier pin
29*a* intermediate site
29*b* first extended site
29*c* second extended site
30 second planetary gear mechanism
32 second sun gear (first element)
34 second planetary gear
36 second internal gear (third element)
38 second carrier (second element)
39 second carrier pin
39*a* intermediate site
39*b* first extended site
39*c* second extended site
50 output sensor
80 connection member
80*a* engaging portion
80*b* outer tooth portion
81 body portion
81*a* first engaging hole
82 end wall portion
82*a* second engaging hole
83 connection portion
84 support boss portion
84*a* retainer ring 84b retainer ring
85 extended portion
85a other side face
90 output shaft
90a engaging portion
91 radial enlarged portion
91a one end face
91b other end face
91c outer peripheral face
91d depression
92 thrust bearing
100A power-split stepless transmission (HMT device)
100B power-split stepless transmission (HMT device)
110 stepless transmission (hydraulic stepless transmission (HST))
112 pump shaft
114 hydraulic pump
115 closed circuit
116 motor shaft
118 hydraulic motor
120 output adjusting member
125 main drive shaft
130 HST transmission gear train
132 drive gear
134 driven gear
135(1) first transmission gear train
135(2) second transmission gear train
135(3) third transmission gear train
136(1) first drive gear
136(2) second drive gear
136(3) third drive gear
137(1) first driven gear
137(2) second driven gear
137(2)a tooth portion
137(2)b cylindrical boss portion
137(3) third driven gear
145(1) first clutch actuated member
145(2) second clutch actuated member
145(3) third clutch actuated member
146 oil supply line
146a first pressure regulating relief valve
147 drain line
148(1) first supply/discharge line
149a(1) first axial oil path
149b(1) first radial oil path
150(1) first clutch solenoid valve
148(2) second supply/discharge line
149a(2) second axial oil path
149b(2) second radial oil path
150(2) second clutch solenoid valve
155 forward and rearward actuated member
156F forward supply/discharge line
157F forward solenoid valve
156R rearward supply/discharge line
157R rearward solenoid valve
161 lubricant supply line
161a second pressure regulating relief valve
162 lubricant guide line
163 lubricant axial line path
165 first planetary gear lubricant guide path
165a first planetary gear lubricant takeout path
165b first oil path
165c first pin oil path
165d oil groove
165e radial oil path
166 second planetary gear lubricant guide path
166a second planetary gear lubricant takeout path
166b second oil path
166c second pin oil path
167 first clutch lubricant guide path
167a first clutch lubricant takeout path
168 second clutch lubricant guide path
168a second clutch lubricant takeout path
180(1) first clutch mechanism
180a outer tooth portion
181(1) first clutch housing
182(1) first friction plate group
183(1) first piston
184(1) return spring
180(2) second clutch mechanism
181(2) second clutch housing
182(2) second friction plate group
183(2) second piston
184(2) return spring
186(2) body portion
187(2) end wall portion
188(2) connection portion
180(3) third clutch mechanism
180D(1) modified first clutch mechanism
181D(1) first clutch housing
182D(1) first friction plate group
183D(1) first piston
184D(1) return spring
185D(1) first rotary member
200A transmission structure
200B transmission structure
200C transmission structure
210 middle drive shaft
215 run output shaft
220 forward and rearward switch mechanism
230 differential mechanism
240 run brake mechanism
235 differential lock mechanism
250 auxiliary drive wheel-dedicated drive power takeout mechanism
260 PTO shaft
265 PTO clutch
270 PTO multi-step transmission
280 auxiliary transmission
300 control unit
310 speed-change operated member
315 Shift position sensor
320 HST actuated member
330F forward gear train
331F forward drive gear
332F forward-side driven gear
340F forward-side clutch mechanism
330R rearward gear train
331R rearward drive gear
332R rearward-side driven gear
333R Idle gear
340R rearward-side clutch mechanism
410 drive source
411 flywheel
420 main drive shaft
430 hydraulic pressure source
500 bearing bush
500a radial oil path
501 needle bearing
510 lubricant supply mechanism
520 rotary sensor
521 dedicated detected gear
522 bearing
523 retainer ring 524 retainer ring
530 transmission case

The invention claimed is:

1. A planetary gear assembly that forms a power-split stepless transmission in cooperation with a stepless transmission for steplessly changing, between a first speed and a second speed, standard speed power operatively input from a drive source, the planetary gear assembly comprising:
   a cylindrical transmission shaft to which an stepless speed-change output is input;
   an output shaft that, while being at least partially extended outward from the transmission shaft, is placed in the transmission shaft with a free relative rotation about an axial line;
   a first planetary gear mechanism having three planetary elements including a first sun gear, a first carrier, and a first internal gear, the first sun gear being supported to the transmission shaft without a relative rotation about an axial line, the first planetary gear mechanism being so made that one of the first carrier and the first internal gear forms a standard rotary speed power input unit to which the standard rotary speed power is input;
   a second planetary gear mechanism having three planetary elements including a second sun gear, a second carrier, and a second internal gear, the second planetary gear mechanism being so made that the second sun gear is supported to the transmission shaft without a relative rotation about an axial line, and between the second carrier and the second internal gear, a planetary element different from a planetary element that forms the standard rotary speed power input unit in the first planetary gear mechanism forms a standard rotary speed power input unit to which the standard rotary speed power is input;
   a first clutch mechanism that is placed coaxially with the transmission shaft, and that engages and disengages a power transmission of the standard rotary speed power to the standard rotary speed power input unit of the first planetary gear mechanism;
   a second clutch mechanism that is placed coaxially with the transmission shaft, and that and engages and disengages a power transmission of the standard rotary speed power to the standard rotary speed power input unit of the second planetary gear mechanism; and
   a connection member extrapolated to the transmission shaft with a free relative rotation about an axial line,
   wherein the connection member, without a relative rotation around an axial line, connects, among the three planetary elements in the first planetary gear mechanism, the planetary element that forms a composite output unit other than the first sun gear and the planetary element that forms the standard rotary speed power input unit, with, among the three planetary elements in the second planetary gear mechanism, the planetary element that forms a composite output unit other than the second sun gear and the planetary element that forms the standard rotary speed power input unit, and the connection member, meanwhile, is non-rotatable relative to the output shaft about an axial line.

2. The planetary gear assembly according to claim 1, further comprising:
   a first driven gear which is directly or indirectly supported to the output shaft with a free relative rotation about an axial line, and to which the standard rotary speed power is input,
   a second driven gear that is directly or indirectly supported to the transmission shaft with a free relative rotation about an axial line, and to which the standard rotary speed power is input,
   wherein the first clutch mechanism is so supported to the output shaft as to engage and disengage the power transmission from the first driven gear to the standard rotary speed power input unit of the first planetary gear mechanism, and the second clutch mechanism is so supported to the transmission shaft as to engage and disengage the power transmission from the second driven gear to the standard rotary speed power input unit of the second planetary gear mechanism.

3. The planetary gear assembly according to claim 2, further comprising:
   a third driven gear which is directly or indirectly supported to the transmission shaft with a free relative rotation about an axial line, to which the standard rotary speed power is input, and which is smaller in pitch diameter than the second driven gear, and
   a third clutch mechanism so supported to the transmission shaft as to engage and disengage the power transmission from the third driven gear to the standard rotary speed power input unit of the second planetary gear mechanism.

4. The planetary gear assembly according to claim 2, wherein the first internal gear and the second carrier form the standard rotary speed power input unit, and the connection member connects the first carrier and the second internal gear without a relative rotation about an axial line.

5. The planetary gear assembly according to claim 4, wherein the first clutch mechanism has a first clutch housing directly or indirectly supported to the output shaft with a free relative rotation about an axial line, a first friction plate group including a first drive-side friction plate supported to the first clutch housing without a relative rotation and with an axial movement, and a first driven-side friction plate placed opposing the first drive-side friction plate, a first rotary member that, while being extrapolated to the output shaft with a free relative rotation about an axial line, supports the first driven-side friction plate without a relative rotation and with an axial movement, and a first piston that frictionally engages the first friction plate group by a pressure oil supplied to an oil chamber in the first clutch housing,
   the first clutch housing is connected to the first driven gear without a relative rotation about an axial line, and
   the first rotary member is connected to the first internal gear without a relative rotation about an axial line.

6. The planetary gear assembly according to claim 5, wherein the second clutch mechanism has a second clutch housing directly or indirectly supported to the transmission shaft with a free relative rotation about an axial line, a second friction plate group including a second drive-side friction plate supported to the second clutch housing without a relative rotation and with an axial movement, and a second driven-side friction plate placed opposing the second drive-side friction plate, a second rotary member that, while being extrapolated to the transmission shaft with a free relative rotation about an axial line, supports the second driven-side friction plate without a relative rotation and with an axial movement, and a second piston that frictionally engages the second friction plate group by a pressure oil supplied to an oil chamber in the second clutch housing, the second clutch housing is connected to the second driven gear without a relative rotation about an axial line, and the second rotary member is connected to the second carrier without a relative rotation about an axial line of the second sun gear.

7. The planetary gear assembly according to claim 4, further comprising:
a first carrier pin that is provided in the first carrier, and that supports the first planetary gear, with a free rotation about an axial line, which is meshed with both the first sun gear and the first internal gear and which revolves around the first sun gear, the first carrier pin having an intermediate site which supports the first planetary gear, and first and second extended sites that extend from the intermediate site to one side and another side in an axial direction, respectively, in the connection member: a first annular unit positioned on one side in an axial direction, a second annular unit which is, on the other side in the axial direction, spaced apart from the first annular unit, and a connection portion that connects the first and second annular units, in the first and second annular units: a first engaging hole into which the first extended site of the first carrier pin is inserted, and a second engaging hole into which the second extended site of the first carrier pin is inserted, respectively, the connection portion being so configured as to connect the first and second annular units, while defining space which is for placing the planetary gear supported to the intermediate site of the first carrier pin, and a concave and convex engaging portion that engages concavely/convexly with an outer peripheral face of the output shaft and an outer tooth portion that engages with the second internal gear which are provided on an inner peripheral face and an outer peripheral face, respectively, which are formed by the first annular unit, the connection portion and the second annular unit.

8. The planetary gear assembly according to claim 4,
wherein the first planetary gear mechanism so sets a gear ratio that, in a transmission state in which the standard rotary speed power is operatively input to the first internal gear forming the standard rotary speed power input unit and stepless speed-change output is operatively input to the first sun gear, the first carrier rotates at an increasing speed in a first rotary direction on one side about the axial line as the stepless speed-change output is changed from the first speed's side to the second speed's side, and the first carrier rotates at a given first gear maximum speed in the first rotary direction when the stepless speed-change output is set at a given first gear maximum speed set speed;

the second planetary gear mechanism so sets a gear ratio that, in a transmission state in which the standard rotary speed power is operatively input to the second carrier forming the standard rotary speed power input unit and stepless speed-change output is operatively input to the second sun gear, the second internal gear rotates at a first gear maximum speed in the first rotary direction when the stepless speed-change output is set to the first gear maximum speed HST speed, and the rotary speed of the second internal gear is increased from the first gear maximum speed to a second gear maximum speed as the stepless speed-change output is changed from the first gear maximum speed set speed toward the second speed's side up to a given second gear maximum speed set speed.

9. The planetary gear assembly according to claim 8,
wherein the gear ratio of the first planetary gear mechanism is so set that, in the transmission state, the first carrier is set to 0 speed when the stepless speed-change output is set to a given 0 speed set speed.

10. The planetary gear assembly according to claim 9,
wherein the 0 speed set speed is a speed that is changed, by a given speed, from the first speed to the second speed's side.

11. The planetary gear assembly according to claim 1, further comprising:
an interlocked gear train which is supported to the transmission shaft without a relative rotation, and to which the stepless speed-change output is input.

12. An HMT device that works in cooperation with an HST that, between a first HST speed and a second HST speed, steplessly changes a standard rotary speed power operatively input from a drive source to a pump shaft, and outputs an HST output, which is after the speed change, from a motor shaft, the HMT device comprising:
a drive shaft to which the standard rotary speed power is operatively transmitted from the drive source;

cylindrical transmission shaft to which the HST output is operatively transmitted from the motor shaft;

an output shaft, in a state where at least a part of the output shaft extended outward from the transmission shaft, inserted into the transmission shaft with a free relative rotation about a shaft line;

a first planetary gear mechanism that has three planetary elements including a first sun gear, a first carrier, and a first internal gear, the first sun gear being supported to the transmission shaft without a relative rotation about an axial line, and one of the first carrier and the first internal gear forming a standard rotary speed power input unit to which the standard rotary speed power is input;

a first transmission gear train including a first drive gear that is supported to the drive shaft without a relative rotation about an axial line, and a first driven gear that, while being directly or indirectly supported to the output shaft with a free relative rotation about an axial line, is operatively meshed with the first drive gear;

a first clutch mechanism that is placed coaxially with the transmission shaft, and that engages and disengages a power transmission of the standard rotary speed power from the first driven gear to the standard rotary speed power input unit of the first planetary gear mechanism;

a second planetary gear mechanism that has three planetary elements including a second sun gear, a second carrier, and a second internal gear, the second planetary gear mechanism being so made that the second sun gear is supported to the transmission shaft without a relative rotation about an axial line, and between the second carrier and the second internal gear, a planetary element different from a planetary element that forms the standard rotary speed power input unit in the first planetary mechanism forms a standard rotary speed power input unit to which the standard rotary speed power is input;

a second transmission gear train including a second drive gear that is supported to the drive shaft without a relative rotation about an axial line, and a second driven gear that, while being directly or indirectly supported to the transmission shaft with a free relative rotation about an axial line, is operatively meshed with the second drive gear;

a second clutch mechanism that is placed coaxially with the transmission shaft, and that engages and disengages a power transmission of the standard rotary speed power from the second driven gear to the standard rotary speed power input unit of the second planetary gear mechanism, a connection member extrapolated to the transmission shaft with a free relative rotation about an axial line, wherein the connection member, without a relative rotation around an axial line, connects, among the three planetary elements in the first planetary gear mechanism, the planetary element that forms a composite output unit other than the first sun gear and the planetary element that forms the standard rotary speed power input unit, with, among the three planetary elements in the second planetary gear mechanism, the planetary element that forms a composite output unit other than the second sun gear and the planetary element that forms the standard rotary speed power input unit, and the connection member, meanwhile, is non-rotatable relative to the output shaft about an axial line.

13. The HMT device according to claim 12,
wherein the first internal gear and the second carrier form the standard rotary speed power input unit, and
the connection member connects the first carrier and the second internal gear without a relative rotation about an axial line,
a gear ratio of the first planetary gear mechanism is so that, in a transmission state, the first carrier is 0 speed when the HST output is set to a given 0 speed set HST speed, the first carrier rotates at an increasing speed in a first rotary direction, which is one side about the axial line, as the HST output is changed from the first HST speed's side to the second HST speed's side, and the first carrier rotates at a given first gear maximum speed in the first rotary direction when the HST output is set to a given first gear maximum speed HST speed,
a gear ratio of the second planetary gear mechanism is so that, in the transmission state, the second internal gear rotates at a first gear maximum speed in a first rotary direction when the HST output is set to the first gear maximum speed HST speed, and the rotary speed of the second internal gear increases from the first gear maximum speed to a second gear maximum speed as the HST output is changed from the first gear maximum speed HST speed toward the second HST speed's side up to a given second gear maximum speed HST speed.

14. The HMT device according to claim 13, further comprising:
a third transmission gear train that includes a third drive gear supported to the drive shaft without a relative rotation about an axial line, and a third driven gear that, while being directly or indirectly supported to the transmission shaft with a free relative rotation about an axial line, is operatively meshed with the third drive gear, and
a third clutch mechanism that is placed coaxially with the transmission shaft, and engages and disengages a power transmission of the standard rotary speed power from the third driven gear to the standard rotary speed power input unit of the second planetary gear mechanism,
wherein the third transmission gear train is higher in speed change ratio than the second transmission gear train.

15. The HMT device according to claim 14, further comprising,
a speed-change operated member operable by a human operator in a shift range between a 0 speed position and a maximum speed position;

a shift position sensor that detects a shift position of the speed-change operated member;
a first clutch actuated member that switches an engaging and disengaging actuation of the first clutch mechanism;
a second clutch actuated member that switches an engaging and disengaging actuation of the second clutch mechanism;
a third clutch actuated member that switches an engaging and disengaging actuation of the third clutch mechanism;
an HST actuated member that actuates the output adjusting member of the HST;
an output sensor that directly or indirectly detects rotary speed of the output shaft; and
a control unit that controls actuations of the first to third clutch actuated members and the HST actuated member,
wherein the shift range is divided into a low speed side first gear shift range set in a range from the 0 speed position to the first gear maximum speed position, a middle speed side second gear shift range set in a range from the first gear maximum speed position to the second gear maximum speed position, and a high speed side third gear shift range set in a range from the second gear maximum speed position to the maximum speed position,
the control unit actuates the first to third clutch actuated members in response to a shift state of the speed-change operated member, as follows:
(1) <when the speed-change operated member is> in the first gear shift range, engaging the first clutch mechanism and shutting off the second and third clutch mechanisms thereby to generate a first gear transmission state,
(2) <when the speed-change operated member is> in the first gear maximum speed position, engaging one of the first and second clutch mechanisms and shutting off the clutch mechanism which remains,
(3) <when the speed-change operated member is> in the second gear shift range, shutting off the first and third clutch mechanisms and engaging the second clutch mechanism thereby to generate a second gear transmission state,
(4) <when the speed-change operated member is> in the second gear maximum speed position, engaging one of the second and third clutch mechanisms and shutting off the clutch mechanism which remains, and
(5) <when the speed-change operated member is> in the third gear shift range, shutting off the first and second clutch mechanisms and engaging the third clutch mechanism thereby to generate a third gear transmission state, and
the control unit further actuates the HST actuated member in response to the shift state of the speed-change operated member, as follows:
(1) <when the speed-change operated member is> in the 0 speed position, the HST output is the 0 speed set HST speed,
(2) the HST output is changed from the first HST speed's side to the second HST speed's side in response to <the speed-change operated member's> operation to an increasing speed side in the first gear transmission state, and the HST output becomes a first gear maximum speed HST speed when <the speed-change operated member's> reaches the first gear maximum speed position,
(3) the HST output is changed from the second HST speed's side to the first HST speed's side in response to <the speed-change operated member's> operation to the increasing speed side in the second gear transmission state, and the HST output becomes the second gear maximum speed HST speed in <the speed-change operated member's> second gear maximum speed position, (4) the HST output is changed from the second gear maximum speed HST speed to a third gear minimum speed HST speed at the time of shifting from the second gear transmission state to the third gear transmission state, and (5) the HST output is changed from the second HST speed's side to the first HST speed's side in response to <the speed-change operated member's> operation to the increasing speed side in the third gear transmission state, and the HST output becomes a given third gear maximum speed HST speed in response to (the speed-change operated member's) operation to the maximum speed position, wherein the third gear minimum speed HST speed is so set that the output shaft's rotary speed when the HST output is set to the second gear maximum speed in the second gear transmission state matches the output shaft's rotary speed when the HST output is set to the third gear minimum speed HST speed in the third gear transmission state.

16. The first clutch mechanism provided in the HMT device according to claim 12, further comprising:
    a first clutch housing directly or indirectly supported to the output shaft with a free relative rotation about an axial line,
    a first friction plate group including a first drive-side friction plate supported to the first clutch housing without a relative rotation and with an axial movement, and a first driven-side friction plate placed opposing the first drive-side friction plate,
    the first rotary member, while being extrapolated to the output shaft with a free relative rotation about an axial line, supports the first driven-side friction plate without a relative rotation and with an axial movement, and
    a first piston that frictionally engages the first friction plate group by a pressure oil supplied to an oil chamber in the first clutch housing,
wherein the first clutch housing is connected to the first driven gear without a relative rotation about an axial line, and the first rotary member is connected to the first internal gear without a relative rotation about an axial line.

17. The second clutch mechanism provided in the HMT device according to claim 12, further comprising:
    a second clutch housing directly or indirectly supported to the transmission shaft with a free relative rotation about an axial line,
    a second friction plate group including a second drive-side friction plate supported to the second clutch housing without a relative rotation and with an axial movement, and a second driven-side friction plate placed opposing the second drive-side friction plate,
    a second rotary member that, while being extrapolated to the transmission shaft with a free relative rotation about an axial line, supports the second driven-side friction plate without a relative rotation and with an axial movement, and
    a second piston that frictionally engages the second friction plate group by a pressure oil supplied to an oil chamber in the second clutch housing,
wherein the second clutch housing is connected to the second driven gear without a relative rotation about an axial line, and the second rotary member is connected to the second carrier without a relative rotation about an axial line of the second sun gear.

18. The HMT device according to claim 12, further comprising:
    a speed-change operated member operable by a human operator in a shift range between a 0 speed position and a maximum speed position,
    a shift position sensor that detects a shift position of the speed-change operated member,
    a first clutch actuated member that switches an engaging and disengaging actuation of the first clutch mechanism,
    a second clutch actuated member that switches an engaging and disengaging actuation of the second clutch mechanism,
    an HST actuated member that actuates an output adjusting member of the HST,
    an output sensor that directly or indirectly detects a rotary speed of the output shaft,
    a control unit that controls actuations of the first and second clutch actuated members and the HST actuated member,
wherein the shift range is defined as a low speed side first gear shift range set in a range from the 0 speed position to the first gear maximum speed position, and a high speed side second gear shift range set in a range from the first gear maximum speed position to the maximum speed position, and the control unit actuates the first and second clutch actuated members in response to a shift state of the speed-change operated member, as follows:

(1) <when the speed-change operated member is> in the first gear shift range, engaging the first clutch mechanism and shutting off the second clutch mechanism thereby to generate a first gear transmission state, (2) <when the speed-change operated member is> in the first gear maximum speed position, engaging one of the first and second clutch mechanisms and shutting off another of the first and second clutch mechanisms, and (3) <when the speed-change operated member is> in the second gear shift range, shutting off the first clutch mechanism and engaging the second clutch mechanism thereby to generate a second gear transmission state, and the control unit further operates the HST actuated member so that the HST output becomes a 0 speed set HST speed in response to the speed-change operated member's operation to the zero speed position, the HST output is shifted from the first HST speed's side to the second HST speed's side in response to the speed-change operated member's operation to the increasing speed side in the first gear transmission state, the HST output becomes the first gear maximum speed HST speed in response to the speed-change operated member's operation to the first gear maximum speed position, the HST output is shifted from the second HST speed's side to the first HST speed's side in response to the speed-change operated member's operation to the increasing speed side in the second gear transmission state, and the HST output becomes the second gear maximum speed HST speed in response to the speed-change operated member's operation to the second gear maximum speed position.

19. The HMT device according to claim 17, further comprising:
    a forward and rearward switch mechanism that is capable of selectively taking between a forward rotary output state in which HMT power operatively input from the output shaft is output without changing a rotary direction of the HMT power, and a reverse rotary output state in which the HMT power is output by reversing the rotary direction, and
    a forward and rearward actuated member that actuates the forward and rearward switch mechanism, wherein the shift range of the speed-change operated member includes a forward-side shift range from the zero speed position to the forward-side maximum speed position, and a rearward-side shift range from the zero speed position to the rearward-side maximum speed position, the control unit actuates the forward and rearward actuated member so that the forward and rearward switch mechanism is in the forward rotary output state when the speed-change operated member is positioned in the forward-side shift range, and the forward and rearward switch mechanism is in the reverse rotary output state when the speed-change operated member is positioned in the rearward-side shift range.

20. The HMT device according to claim 17, further comprising:
   a forward and rearward switch mechanism that is capable of selectively taking between a forward rotary output state in which HMT power operatively input from the output shaft is output without changing a rotary direction of the HMT power, and a reverse rotary output state in which the HMT power is output by reversing the rotary direction, and
   a forward and rearward switch operated member for human operation, wherein the output state of the forward and rearward switch mechanism is switched in response to the operation of the forward and rearward switch operated member.

* * * * *